(12) United States Patent
Joffe et al.

(10) Patent No.: US 6,307,860 B1
(45) Date of Patent: Oct. 23, 2001

(54) SYSTEMS AND METHODS FOR DATA TRANSFORMATION AND TRANSFER IN NETWORKS

(75) Inventors: Alexander Joffe, Palo Alto; Dmitry Vyshetsky, Cupertino, both of CA (US)

(73) Assignee: MMC Networks, Inc., Sunnyvale, CA (US)

( * ) Notice: Subject to any disclaimer, the term of this patent is extended or adjusted under 35 U.S.C. 154(b) by 0 days.

(21) Appl. No.: 09/055,044

(22) Filed: Apr. 3, 1998

(51) Int. Cl.[7] .................................................. H04L 12/28
(52) U.S. Cl. ........................................... 370/412; 370/389
(58) Field of Search ................................... 370/389, 392, 370/394, 395, 401, 402, 231, 235, 412, 413, 415, 417, 422

(56) References Cited

U.S. PATENT DOCUMENTS

| | | |
|---|---|---|
| 2,686,844 | 8/1954 | Brewer . |
| 4,885,744 | 12/1989 | Lespagnol et al. ................... 370/466 |
| 5,058,144 | 10/1991 | Fiala et al. ............................ 375/240 |
| 5,062,106 | 10/1991 | Yamazaki ............................. 270/417 |
| 5,136,584 | 8/1992 | Hedlund .............................. 370/94.1 |
| 5,233,606 | 8/1993 | Pashan et al. ....................... 270/418 |
| 5,261,062 | 11/1993 | Sato ..................................... 395/375 |
| 5,303,302 | 4/1994 | Burrows ................................ 380/49 |
| 5,311,509 | 5/1994 | Heddes et al. ....................... 370/397 |
| 5,337,308 | 8/1994 | Fan ...................................... 270/414 |
| 5,357,617 | 10/1994 | Davis et al. .......................... 395/375 |
| 5,361,255 | 11/1994 | Diaz et al. ........................... 370/58.1 |
| 5,402,415 | 3/1995 | Turner .................................. 370/60 |
| 5,440,523 | 8/1995 | Joffe ................................ 365/230.05 |
| 5,457,681 | 10/1995 | Gaddis et al. ........................ 370/56 |
| 5,457,687 | 10/1995 | Newman ............................. 370/85.3 |
| 5,517,495 | 5/1996 | Lund et al. ........................... 370/60 |
| 5,528,588 | 6/1996 | Bennett et al. ....................... 370/60 |
| 5,541,912 | 7/1996 | Choudhury et al. ................. 370/17 |
| 5,546,390 | 8/1996 | Stone ................................... 370/60 |
| 5,555,017 | 9/1996 | Landante et al. ..................... 348/15 |
| 5,555,264 | 9/1996 | Sallberg et al. ...................... 370/17 |
| 5,557,611 | 9/1996 | Cappellari et al. .................. 270/414 |
| 5,583,862 | 12/1996 | Callon ................................. 370/397 |
| 5,583,863 | 12/1996 | Darr, Jr. et al. ..................... 370/397 |
| 5,592,476 | 1/1997 | Calamvokis et al. ............... 270/413 |
| 5,623,489 | 4/1997 | Cotton et al. ....................... 370/381 |

(List continued on next page.)

FOREIGN PATENT DOCUMENTS

| | | | |
|---|---|---|---|
| 5-344143 | 12/1993 | (JP) | ................................ J04L/12/48 |
| 7-321780 | 12/1995 | (JP) | ............................. H04L/12/18 |
| 8-509339 | 1/1996 | (JP) | ............................. H04L/12/28 |
| 8-70321 | 12/1996 | (JP) | ............................. H04L/12/64 |
| WO 95/20282 | 7/1995 | (WO) . | |
| WO 95/32570 | 11/1995 | (WO) . | |
| WO 98/09409 | 3/1998 | (WO) . | |

OTHER PUBLICATIONS

"An Overview of ATM LAN Emulation", World Wide Web, Interphase Corporation, Mar. 1996, pp. 1–8.
"LAN Emulation", World Wide Web, Nov. 1995, pp. 1–18.
B. Klessig, "ATM LAN Emulation", World Wide Web, 3Com Corporation, pp. 1–20.

(List continued on next page.)

Primary Examiner—David R. Vincent
(74) Attorney, Agent, or Firm—Skjerven Morrill MacPherson, LLP; Michael Shenker

(57) ABSTRACT

A processor system suitable to provide an interface between networks includes a software programmable processor and a channel processor that receives data from a network and transforms data at commands from the software programmable processor. The channel can execute only a few simple commands, but these commands are sufficient for a wide range of systems. The commands include (1) a command to transmit received data, perhaps skipping some data; and (2) a command to transmit data specified by the command itself rather than the received data. The channel is fast, simple and inexpensive.

41 Claims, 12 Drawing Sheets

U.S. PATENT DOCUMENTS

| | | | |
|---|---|---|---|
| 5,629,928 | 5/1997 | Calvignac et al. | 370/237 |
| 5,633,859 | 5/1997 | Jain et al. | 370/234 |
| 5,633,867 | 5/1997 | Ben-Num et al. | 370/399 |
| 5,664,116 | 9/1997 | Gaytan et al. | 395/200.64 |
| 5,689,508 | 11/1997 | Lyles | 370/391 |
| 5,704,047 | 12/1997 | Schneeberger | 395/200.65 |
| 5,715,250 | 2/1998 | Watanabe | 370/395 |
| 5,719,853 | 2/1998 | Ikeda | 370/229 |
| 5,732,082 | 3/1998 | Wartski et al. | 370/395 |
| 5,748,629 | 5/1998 | Caldara et al. | 370/413 |
| 5,751,709 | 5/1998 | Rathnavelu | 370/412 |
| 5,751,951 | 5/1998 | Osborne et al. | 395/200.8 |
| 5,809,024 | 9/1998 | Ferguson et al. | 370/395 |
| 5,812,527 | 9/1998 | Kline et al. | 370/232 |
| 5,828,844 | 10/1998 | Civanlar et al. | 395/200.58 |
| 5,838,915 | 11/1998 | Klausmeier et al. | 370/412 |
| 5,850,395 | 12/1998 | Hauser et al. | 370/398 |
| 5,862,136 | 1/1999 | Irwin | 370/395 |
| 5,875,352 | 2/1999 | Gentry et al. | 395/842 |
| 5,960,074 | 9/1999 | Clark | 379/310 |
| 6,009,097 | 12/1999 | Han | 370/395 |
| 6,018,759 | 1/2000 | Doing et al. | 709/108 |
| 6,064,674 | 5/2000 | Doidge et al. | 370/398 |
| 6,085,238 | 7/2000 | Yuasa et al. | 709/223 |
| 6,108,304 | 8/2000 | Abe | 370/232 |

OTHER PUBLICATIONS

"ATM Internetworking", World Wide Web, Cisco Systems, Inc., 1995, pp. 1–60.

Allyn Romanow et al. "Dynamics of TCP Traffic Over ATM Networks" *IEEE Journal on Selected Areas in Communications*, vol. 13, No. 4, pp 633–641, May 1995.

Alan Demers et al. "Analysis and Simulation Of A Fair Queueing Algorithm" ©1989 ACM, pp 1–12.

"ATMS2003B Switch Controller 1 "White"", *MMC Networks*, Dec. 1995, 32 pages.

Beraldi, R., et al: "Selective BECN Schemes for Congestion Control of ABR Traffic in ATM LAN", *1996 IEEE Int'l Conf. on Communications (ICC), Converging Technologies for Tomorrow's Applications*, Dallas, Jun. 23–27, 1996. pp. 503–507.

Dutton, Harry, J.R. and Lenhard, Peter, "Asynchronous Transfer Mode (ATM) Technical Overview" (IBM, Prentice–Hall PTR, New Jersey, 1995), pp. 3–1 through 3–25 and 9–1 through 9–34.

Flanagan, William A., "ATM (Asyncrhronous Transfer Mode) User's Guide," (Flatiron Publishing, Inc. New York, 1994), pp. 25–49.

Hongqing Li et al. "A Simulation Study of TCP Performance in ATM Networks With ABR and UBR Services" *Proceedings vol. 3, 1996 IEEE Infocom '96, Fifteenth Annual Joint Conference of the IEEE Computer and Communications Societies*, Mar. 24–28, 1996, pp v–xvi and pp 1269–1276 (21 pages total including cover page).

Hongqing, Li, et al.: "Performance of TCP Over UBR Service in ATM Networks With Per–VC Early Packet Discard Schemes" *Proceedings of the 1996 IEEE 15th Annual Int' Phoenix Conf. on Computers and Communication*,Mar. 27–29, 1996, pp. 350–357.

Ozveren, C., et al: "Reliable and Efficient Hop–By–Hop Flow Control", *Computer Communications Review*, vol. 24, No. 4, Oct. 1, 1994, pp. 89–100.

Tanenbaum, Andrew S., "Computer Networks" (Prentice Hall PTR, 3rd Ed., 1996) pp. 148–150.

E. Garetti R. Melen, et al., "An Experimental ATM Switching Architecture For The Evolving B–ISDN Scenario", International Switching Symposium '90, vol. IV, pp 15–22.

Endo, Noboru, et al., "A Memory Switch Architecture for ATM Switching Network", SSE 88–56, vol. 88, No. 128, pp. 36–42.

Newton, Harry, Newton's Telecom Dictionary, pp: 929, 1996.*

Microsoft Press, Computer Dictionary second edition, pp: 69 and 318, 1996.*

* cited by examiner

SYSTEMS AND METHODS FOR DATA TRANSFORMATION AND TRANSFER IN NETWORKS

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to data processing, and more particularly to data transformations when data are transferred in networks.

It may be desirable to transform data when data are transferred in networks. For example, a router may replace physical addresses (MAC-layer addresses) in a data packet before transmission. An ATM switch may replace cell headers. Further, a router, a bridge, or some other device that transfers data between networks may perform protocol related transformations if the network on which the data are received and the network on which the data are transmitted use different protocols. See, for example, PCT publication WO 95/20282 (Jul. 27, 1995) incorporated herein by reference.

Such transformations can place a heavy burden on a network processor controlling the device. In addition, the processor may have to perform address resolution searches, screen out traffic that violates restrictions imposed for security reasons or in order to reduce congestion, and doing administrative work. Therefore, the processor performance is an important factor in achieving a high throughput in data transfers in networks.

To achieve high performance, some network processors are implemented as dedicated processors optimized for the specific tasks they have to perform in specific systems. These processors are sometimes hardwired for the specific tasks, protocols and standards. While these processors are fast, they have a disadvantage that they are not easily adaptable to a wide range of tasks, protocols, and standards. Therefore, such processors have limited applicability.

There also exist more intelligent processors adaptable to a wide range of systems having different tasks, protocols and standards. Examples are software programmable processors. However, the higher intelligence often comes at the cost of performance. In particular, software programmable processors can be considerably slower than their hardwired counterparts.

To combine high throughput with adaptability some devices use multiple software programmable processors. However, multiple software programmable processors can make the device expensive.

There is therefore a need for an inexpensive, adaptable, high-throughput processor arrangement.

SUMMARY

The above goals are achieved in some embodiments of the present invention by providing a network processor system which includes at least two processors, a "first" processor and a "second" processor. The first processor determines how data are to be transformed for transmission. The second processor transforms the data at commands from the first processor. For example, in some embodiments, the first processor performs address resolution and determines the new addresses to be inserted into the data. The first processor commands the second processor to transform the data by insertion of the new addresses.

In some embodiments, the first processor is an intelligent processor easily adaptable to different systems. For example, the first processor can be software programmable. Hence, in some embodiments the first processor is slow. However, high throughput is achieved because the first processor is relieved by the second processor from performing data transformations. Further, the second processor can be fast and inexpensive because the second processor does not need much intelligence. Much intelligence is not needed because the second processor transforms data at commands from the first processor and because very few simple types of commands can satisfy requirements of a wide range of tasks, protocols, and standards. In particular, some embodiments include commands such as:

(1) transmit a number of bytes of received data, perhaps skipping some data (the capability to skip data is used to skip an address that has to be replaced, or to skip a checksum, or for other protocol transformations);

(2) transmit data specified in the command, for example, immediate data included in the command or data stored at an address included in the command (this is used to insert a new address or for other transformations).

These simple commands do not require the second processor to possess intelligence to understand data or packet formats or protocols. Therefore, the second processor can be made fast, simple and inexpensive.

Because the second processor can be inexpensive, the entire network processor system can be inexpensive compared to devices with multiple software programmable processors.

In some embodiments the second processor does not transmit data to a network but rather transmits the data to a MAC, an ATM switch or SAR (segmentation and reassembly) device, or some other network device. The network device may transmit the data to a network.

Other embodiments and variations are described below. The invention is defined by the appended claims.

DESCRIPTION OF PREFERRED EMBODIMENTS

Figure 1:
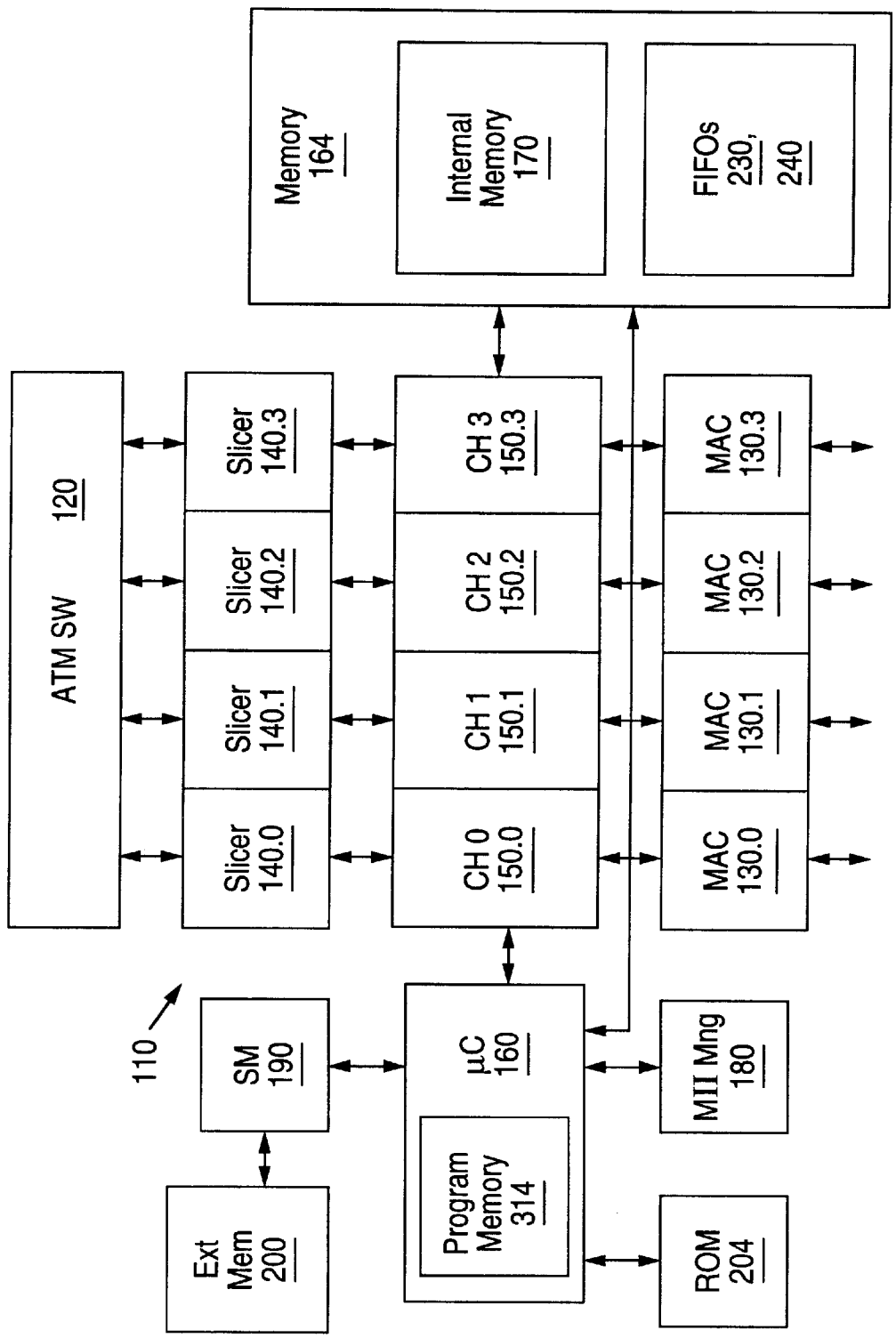
FIG. 1 is a block diagram of a port interface circuit which includes processors according to the present invention.

FIG. 1 illustrates a software programmable port interface (PIF) circuit 110 that transfers data between ATM and Ethernet networks. Port interface 110 includes four full-duplex ports that provide an interface between ATM switch 120 and respective four Ethernet segments (not shown) each of which is connected to a corresponding MAC 130.0–130.3. In each port "x" (x=0,1,2,3) the data between the Ethernet segment and the ATM switch 120 flows through a corresponding MAC 130.x and a corresponding slicer 140.x. The slicer performs the well-known ATM SAR function, segmenting the Ethernet frame into ATM cells and appending ATM headers to the cells on the way to the ATM, switch and assembling the frame from the cells on the way to the Ethernet segment. In some embodiments, the ATM switch interface to PIF 110 operates in frame mode in which the ATM switch transmits a frame of cells to a slicer 140 with no intervening cells. Slicers 140 use the AAL-5 protocol. The frame mode is described, for example, in U.S. patent application Ser. No. 08/706,104 "Cell Queuing in ATM Switches" filed Aug. 30, 1996 by A. Joffe et al. See also PCT application PCT/US97/14821 filed Aug. 28, 1997 and incorporated herein by reference.

Other embodiments of PIF 110 provide interface between other types of networks, not necessarily ATM or Ethernet. In some embodiments, the slicers 140 are replaced by suitable MACs.

One of the processors controlling the PIF 110 is software programmable microcontroller 160. Software programmability makes PIF 110 easily adaptable to changes in network protocols, standards, and particular tasks to be performed. In particular, PIF 110 can be programmed to perform a wide range of tasks including IP routing, layer-2 switching, or other processing. For example, in the data flow from the Ethernet to ATM (the "ingress" flow), PIF 110 can translate the IP addresses to ATM VPI/VCI, change the Ethernet source address (MAC address) to the address of the respective MAC 130, and increment the IP hop count. In the data flow from ATM to the Ethernet, PIF 110 can translate IP destination addresses to destination MAC addresses, and change the Ethernet source address to the address of the respective MAC 130. Alternatively, PIF 110 can perform layer-2 switching; i.e. in the ingress flow (from the Ethernet to ATM) PIF 110 can translate the Ethernet destination address to the VPI/VCI, and in the egress flow (from ATM to Ethernet) transmit the frame without any address processing. Other kinds of frame processing are possible.

PIF 110 can be programmed to implement security restrictions or to limit traffic for any other reasons (for example, to reduce network congestion). For example, PIF 110 can be programmed to implement router access control lists and/or VLANs (virtual LANs). In particular, PIF 110 can store a database in memory 200 indicating which layer-2 or layer-3 source and destination addresses are allowed to communicate with each other. If communication is not allowed, PIF 110 can drop disallowed data or send them to a management station (not shown) for further processing. PIF 110 can perform address resolution and implement access control restrictions, which operations are described for "ridges" (bridges/routers) in PCT publication WO 95/20282 (Jul. 27, 1995) incorporated herein by reference.

Despite low speed sometimes associated with software programmability, PIF 110 has high throughput even at modest clock rates. Thus, in some embodiments, PIF 110 can perform IP translations described above and still provide full-duplex interface between four 100 MB/sec Ethernet ports and respective four 155 MB/sec ATM ports at a clock rate of only 50 MHz.

In FIG. 1, the data flow between each slicer 140.x and the corresponding MAC 130.x is controlled by a corresponding channel 150.x (also called channel "x" below, i.e. channel 0, 1, 2 or 3). The channels 150 execute commands from microcontroller 160. In some embodiments, the four channels 150.x are implemented by a single channel circuit that performs the function of the four channels 150 using time division multiplexing. The channel circuit is not software programmable. The channel circuit is fast and inexpensive.

The channels, the microcontroller, the slicers 140 and the MACs 130 communicate through memory 164 which includes internal memory ("frame and command memory") 170 and other memory described below.

In some Ethernet embodiments, the microcontroller is connected to MII (media independent interface) management circuit 180 connected to the Ethernet physical layer devices known in the art.

Search machine (SM) 190 maintains an address resolution database in memory 200 to do IP routing or other processing as determined by the software. The search machine is able to search for a key (e.g. an Ethernet or IP address) presented to it by the microcontroller 160, and execute a learning algorithm to learn a layer-2 or layer-3 address if the address is not in the database. While search machine 190 is not software programmable in some embodiments, the search machine supports flexible database node structure allowing the search machine to be easily adapted to different functions (e.g. IP routing, layer-2 switching, access control lists implementation or VLAN implementation). Search machine 190 executes commands from the microcontroller, such as Search, Insert, Delete, etc. The search machine also provides the microcontroller with direct access to memory 200. The search machine is described in U.S. patent application "Systems and Methods for Multi-Tasking, Resource Sharing, and Execution of Computer Instructions", application Ser. No. 09/055,003, filed by A. Joffe et al. on Apr. 3, 1998 and incorporated herein by reference.

In some embodiments, memory 200 is implemented using synchronous static RAMs in flow through mode of operation. Multiple banks of memory are used in some embodiments.

In some embodiments, PIF 110 is an integrated circuit. Memory 200 is called "external" because it is not part of the integrated circuit. However, in other embodiments, memory 200 is part of the same integrated circuit. The invention is not limited by any particular integration strategy.

PIF 110 is also connected to a serial read only memory (ROM) 204 (serial EPROM in some embodiments) to allow the software ("firmware") to be loaded from ROM 204 into the microcontroller at boot time.

Figure 2:
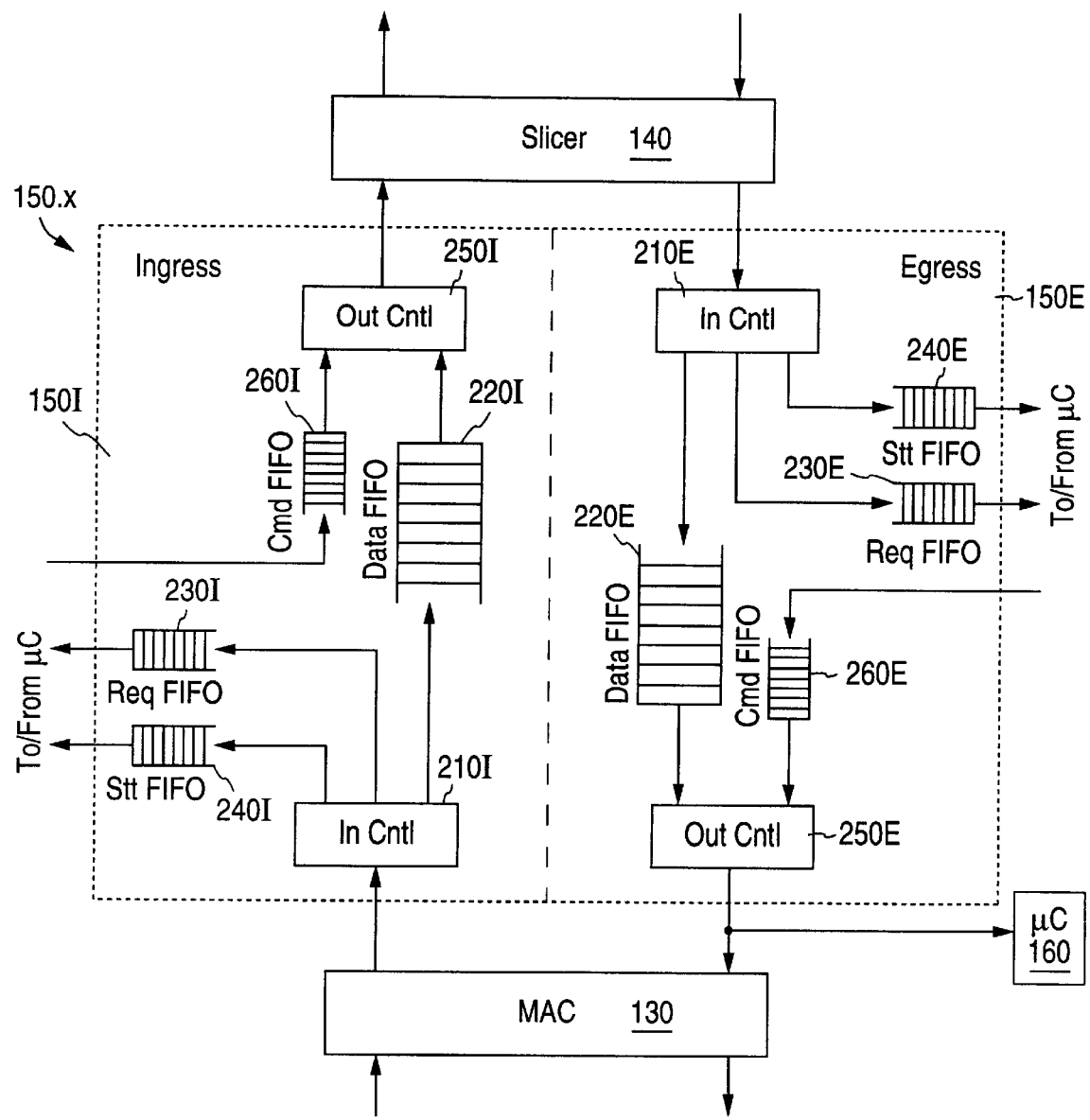
FIG. 2 is a block diagram illustrating interaction between processors of FIG. 1.

FIG. 2 illustrates a single channel 150.x and associated FIFOs in memory 164. The channel is divided into two similar parts: ingress sub-channel 150I that controls the data flow from the corresponding MAC 130 to the corresponding slicer 140; and egress sub-channel 150E that controls the data flow from slicer 140 to MAC 130. In reference numerals, suffix "I" indicates circuits belonging to the ingress sub-channel, and suffix "E" indicates circuits belonging to the egress sub-channel, unless noted otherwise.

In each sub-channel 150I, 150E the data processing includes the following steps:

(1) The corresponding input control block 210 (i.e. 210I or 210E) stores the incoming data in the corresponding data FIFO 220. When a sufficient portion of a data frame has been received to enable the microcontroller to start address translation or other processing (e.g., when the IP address and hop count have been received in IP routing embodiments), input control 210 writes a request to respective request FIFO 230. For ingress, the number of frame bytes ("the ARL threshold") received before the request is written to FIFO 230 is defined by the ARBN field of the respective MAC control register (Addendum 3). For egress, the ARL threshold is defined by the ARBN field of the corresponding Slicer Secondary Mode register (Addendum 4). These registers are written by the microcontroller.

(2) Microcontroller 160 reads the request, reads appropriate parameters (for example, the source and destination addresses on the ingress side or the VPI/VCI on the egress side) from the corresponding data FIFO 220, and performs appropriate processing. The microcontroller uses search machine 190 as needed to perform, for example, address resolution searches.

(3) When the search machine 190 has returned the search results to microcontroller 160, the microcontroller writes one of more channel commands to respective command FIFO 260 which specifies how the frame is to be transferred to the output device (MAC 130 or slicer 140).

The channel commands in one embodiment are described in Addendum 1.

(4) After the entire frame was received, the input control 210 writes status information to respective status FIFO 240. The status FIFO is read by microcontroller 160. The microcontroller uses the status to maintain per-flow statistics.

The input agent (MAC 130 or slicer 140) may indicate that the frame is bad before the input control 210 writes a request for the frame to FIFO 230. In that case, the input control 210 removes the frame from the data FIFO 220 without writing the request or the status to FIFO 230 or 240.

(5) Output control 250 executes commands from respective command FIFO 260.

In some embodiments, data FIFOs 220 and command FIFOs 260 are stored in internal memory 170. Request FIFOs 230 and status FIFOs 240 are stored in memory 230, 240 (FIG. 1).

The size of each data FIFO 220 and command FIFO 260 in memory 170 is programmable by microcontroller 160 (see register CFGR in Addendum 3; "Data buffer" in CFGR description is a buffer allocated for a data FIFO, "Command Buffer" is a buffer allocated for a command FIFO).

Microcontroller 160 has direct access to the data FIFOs, which allows the microcontroller to read addresses or any other incoming data. The microcontroller can also modify incoming data frames, though this is unnecessary in many kinds of processing.

The outputs of egress output control blocks 250E are connected to the microcontroller to enable the ATM switch 120 to load programs ("applets") into the microcontroller for execution. The applets are first transferred to the egress side similarly to other frames, but their VPI/VCI parameters indicate the microcontroller. Hence, the applets are not transferred to MACs 130. Instead, the applets are loaded from the output of circuits 250E to the microcontroller program memory 314 (FIG. 1) by a DMA transfer.

Microcontroller 160 can also generate its own frames, write them to any data FIFO 220, and write commands to the corresponding command FIFO 260. The corresponding output control 250 will transfer the frames as specified by the commands.

The microcontroller can also write command FIFOs 260 with commands to transfer statistics information stored in a separate memory (not shown) for each sub-channel 150I, 150E.

Some microcontroller embodiments are described in the aforementioned U.S. patent Ser. No. 09/055,033 "Systems and Methods for Multi-Tasking, Resource Sharing, and Execution of Computer Instructions", filed by A. Joffe et al. on Apr. 3, 1998 and incorporated herein by reference.

One example of a command sequence executed by the channel to process a frame on the egress side is as follows:

1) One or more commands of type "Transfer Immediate Data" and/or "Transfer from Scratch Pad Area" (see Addendum 1) generate an Ethernet frame header to be placed at the beginning of a frame. The frame header includes the Ethernet destination and source addresses. In addition, "Transfer Immediate Data" instructs the MAC to start CRC computation.

2) The next command (e.g. "Transfer from Data Area") transfers some amount of data from the original frame until the IP hop count, skipping the original header.

3) The next command (e.g. "Transfer Immediate Data") inserts an incremented hop count into the frame.

4) The next command (e.g. "Transfer from Data Area") transfers some data from the original frame, skipping the original hop count.

5) The next command (e.g. "Transfer from Frame Data Area") transfers the remaining data until the end of the frame, dropping the AAL-5 trailer from the end of the frame.

6) The next, and last, command (e.g. "Transfer Immediate Data") instructs the MAC to stop the CRC computation and append the Ethernet checksum (FCS) to the frame.

On the ingress side, an exemplary command sequence is as follows:

1) The first command (e.g. "Transfer Immediate Data") transfers the new ATM header to be used for all the cells in the frame. The slicer 140 will itself append the header to every cell of the frame and will set the Last bit in the PT field of the last cell's header.

2) The next command ("Transfer from Frame Data Area") transfers the rest of the frame, skipping the Ethernet checksum at the end.

In some embodiments, microcontroller 160 is an expensive resource. Of note, in some embodiments the microcontroller instruction execution unit (shown at 310 in FIG. 5 and described below) accounts for about 70% of the gate count of PIF 110. Therefore, it is desirable to fully load the microcontroller. Full loading is achieved by appropriate multi-tasking as follows.

The microcontroller executes four "hardware tasks" HT0, HT1, HT2, HT3, one for each port 0, 1, 2, 3. The hardware tasks are executed in time division multiplexing manner as shown in the following table:

TABLE

| Clock Cycle | 1 | 2 | 3 | 4 | 5 | 6 |
|---|---|---|---|---|---|---|
| Hardware Task | HT0 | HT1 | HT2 | HT3 | HT0 | HT1 |

If a hardware task is not available (because, for example, it is waiting for the search machine), no microcontroller instruction is started in the respective clock cycle.

Each hardware task includes one or more software tasks. Each software task contains code that processes an entire frame. Since a frame on the ingress side and a frame on the egress side can arrive in parallel, in some embodiments each hardware task includes at least two software tasks to allow parallel processing of at least two frames. In some embodiments, different software tasks are provided for the ingress and egress sides. When an ingress software task cannot execute due, for example, to the microcontroller waiting for the search machine, the microcontroller can execute the egress software task, and vice versa.

Below, the term "task" means a software task unless we specifically recite a "hardware task".

While the microcontroller waits for the search machine to perform a search for a frame, the microcontroller is available to execute another software task in the same or other hardware tasks.

In some embodiments, having a single task for each ingress flow and each egress flow does not fully load the microcontroller, and therefore more than one task for each half-duplex data flow are provided to enable the microcontroller to process more than one frame in each data flow in parallel. This is illustrated by the following considerations. The demands on the microcontroller speed are the greatest when the Ethernet frames are short. The shortest Ethernet frame has 64 bytes. Suppose for example that the four Ethernet ports are 100 MB/sec ports and the ATM ports are 155 MB/sec. At 100 MB/sec, the shortest frame goes through the Ethernet port in 5.12 microseconds. Therefore, the microcontroller and the search machine have to process the frame in 5.12+1.6=6.72 microseconds (1.6 microseconds is the inter frame gap).

Let us assume a microcontroller clock speed of 50 MHz. This is a fairly slow clock speed to ensure reliable operation. Higher speeds (for example, 100 MHz) are used in other embodiments. At 50 MHz, the 6.72 microseconds is 336 clock cycles. Therefore, the clock cycle budget for the ingress and egress tasks of a single hardware task is 336/4=84 clock cycles.

Since processing of a frame is divided between the microcontroller and the search machine, which do not necessarily work in parallel on the same frame, the processing latency for one ingress frame and one egress frame in the same hardware task is allowed to be greater than 84 cycles even in wire speed processing. If processing takes more than 84 cycles, and 64-byte frames arrive back to back on the ingress and egress sides, the next frame may start arriving before the previous frame in the same data flow has been processed. Therefore, it is desirable to allow the microcontroller to start processing the next frame before the processing of the previous frame in the same data flow is completed. To implement such parallel processing of multiple frames in the same data flow, more than one software task for each data flow is provided.

A frame is processed by a single task. If the frame is an applet, the applet is executed by the same task.

The microcontroller instruction execution is pipelined. Thus, the table above indicates clock cycles in which a new instruction is started for the respective hardware task. For example, in cycle 1, instruction execution is started for hardware task HT0. The instruction execution continues in subsequent cycles.

To synchronize task access to the search machine, search machine 190 executes commands one after another providing results in the same order.

Selecting a task for execution takes only one clock cycle in each instruction. Further, the task selection is pipelined, and hence does not affect the throughput.

At any time, each task is in one of the three states, Active, Ready, or Suspended. In the Active state, the task is being executed. At most four tasks (one for each hardware task) may be Active at the same time. Each Active task is scheduled for execution once every four clock cycles (see the Table above).

An Active task is transferred to the Suspended state if the task tries to access a resource that is unavailable. When the resource becomes available, the task goes to the Ready state.

When an Active task is suspended, one of the tasks in the Ready state in the same channel is selected for execution by microcontroller 160 and is transferred to the Active state.

Figure 3:
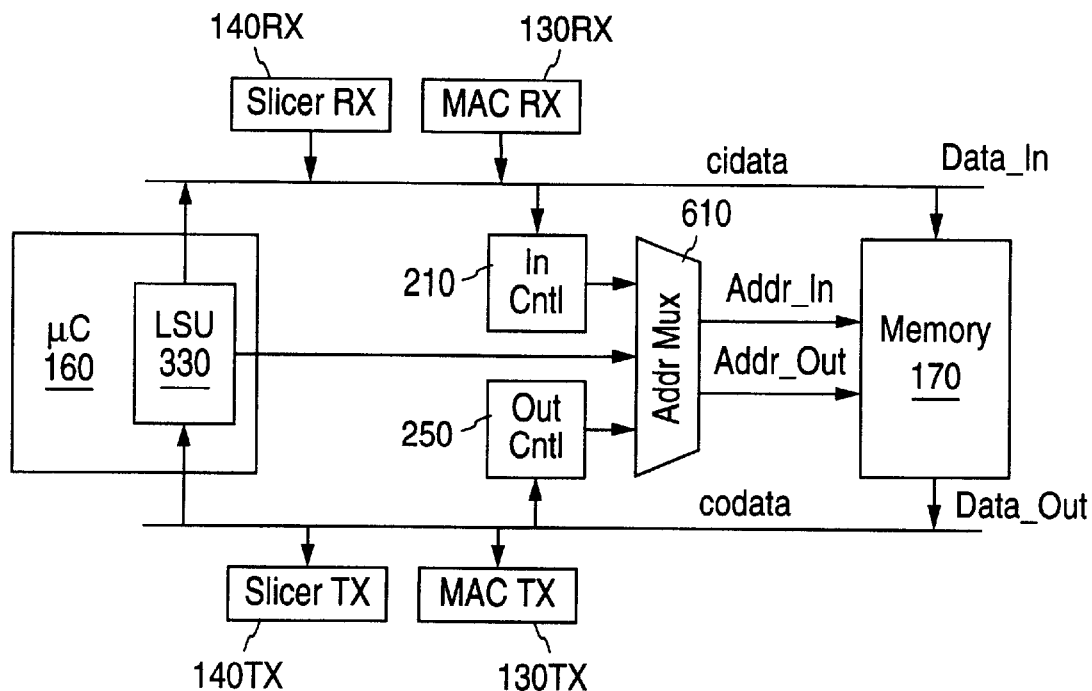
FIG. 3 is a detailed block diagram of a portion of the circuit of FIG. 1.

FIG. 3 illustrates access to internal memory 170 in some embodiments. In FIG. 3, a single channel processor 150 performs the functions of channels 150.0–150.3 using time division multiplexing. This channel processor has one input control circuit 210 and one output control circuit 250 which perform the functions of all the blocks 210, 250 of FIG. 2. Memory 170 has two ports, one for data input and one for data output. The memory is capable to read and write a 64-bit word of data every clock cycle.

In FIG. 3, 64-bit tristatable bus Data-In (also called "cidata") connected to the memory data input port. 64-bit bus Data_Out (also called "codata") is connected to the memory data output port. Corresponding address buses Addr_In, Addr_Out, and corresponding control buses (not shown), are connected to the memory ports. The address and control buses are connected to outputs of multiplexer 610 which receives inputs from input control 210, output control 250, and Load and Store Unit (LSU) 330 of microprocessor 160. The control bus signals are generated by channel 150 as needed.

Each MAC 130 has a receive agent 130RX and a transmit agent 130TX. Each slicer 140 has a receive agent 140RX and a transmit agent 140TX.

The data outputs of all the eight receive agents 130RX, 140RX (four MAC agents and four slicer agents) are connected to the memory input bus Data_In. The data inputs of the eight transmit agents 130TX, 140TX are connected to the memory output bus Data_Out. An output of LSU 330 is connected to Data_In and an input of LSU 330 is connected to Data_Out.

Input control 210 generates memory addresses for data write transactions initiated by receive agents 130RX, 140RX.

Having two buses "codata", "cidata" increases throughput.

Output control 250 generates memory addresses for data read transactions and initiates the read transactions for the transmit agents 130TX, 140TX.

Output control 250 also reads memory 170 for its own use (for example, to read command FIFOs 260 or to read the frame control word (described below in connection with FIG. 9) from data FIFOs 220).

Microcontroller 160 accesses the memory through its LSU 330.

Figure 4:
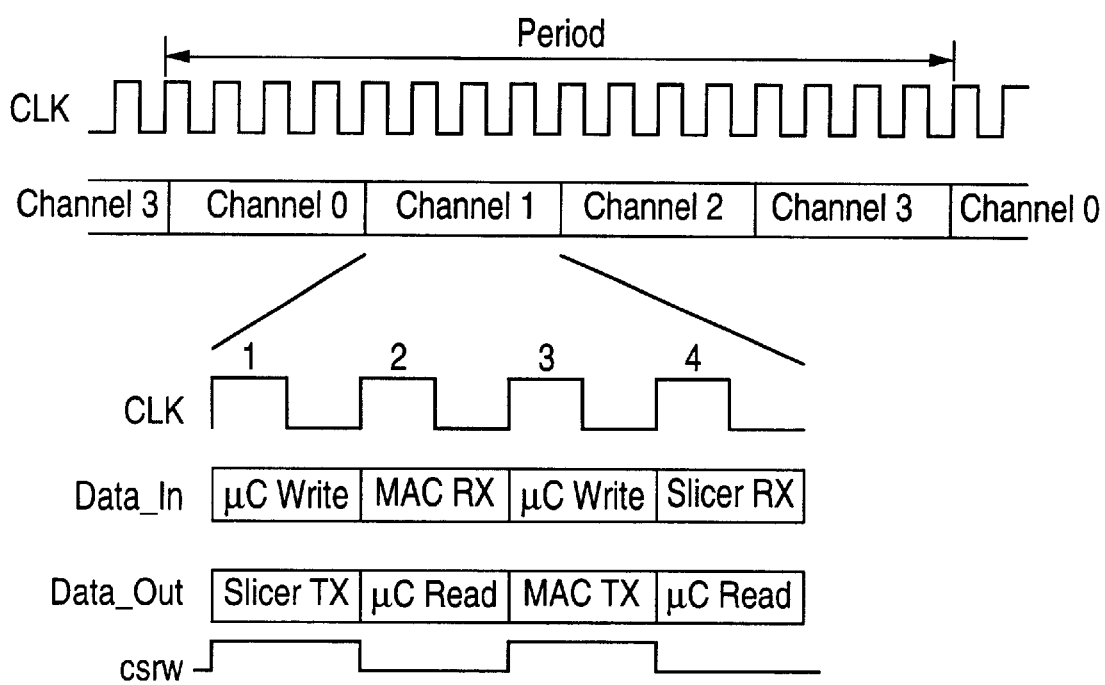
FIGS. 4–8 illustrate timing for the circuit of FIG. 1.

FIG. 4 illustrates memory access timing. Each logical channel 150.x (shown as "Channel x" in FIG. 4) gets four clock cycles to access the memory. The first two cycles are given to the ingress side. In the first cycle, the slicer transmit agent 140TX ("Slicer Tx") 30 reads the memory, and in the second cycle, the MAC receive 140RX ("MAC RX") writes the memory. The next two cycles are for the egress side—in the third cycle MAC transmit 140TX reads the memory, and in the fourth cycle the slicer receive 140RX writes the memory.

The microcontroller can access the memory in every clock cycle through the port not used by the channel. When the channel writes the memory, the microcontroller reads the memory, and vice versa.

Memory access involves the following overhead. For receive agents 130RX, 140TX, there is one cycle overhead for a start of a frame and one cycle overhead for an end of a frame for each frame. For transmit agents 130TX, 140RX, there is one cycle overhead for each frame to read the FCW (frame control word, described below in connection with FIG. 9), and one cycle overhead to read each command.

Channel

The following table lists some signals used in the channel/microcontroller interface. "I" means the signal is an input for the channel. "O" means the signal is a channel output.

TABLE 1

| Signal name | Width | I/O | Function |
|---|---|---|---|
| *Internal Memory Access* | | | |
| csrw | 1 | O | Operation Type Marker for μC; indicates whether the microcontroller is allowed a read or a write. See FIG. 4 |
| maddr[14:0] | 15 | I | Read/Write Address from μC |
| men | 1 | I | Memory Operation Enable from μC |
| *Indication* | | | |
| csem[5:0] | 6 | O | Semaphore ID; CSEM[5] = SCRATCH/NOP Indication |
| cstrobe | 1 | O | Semaphore SET strobe |
| *Command FIFO* | | | |
| mfload[7:0] | 8 | I | CMD FiFo Load strobes (<Channel>, I/E) |
| ccmdfull[7:0] | 8 | O | CMD FIFO Full (<Channel>, I/E) |
| *Req/Status FiFo* | | | |
| cfifodata[15:0] | 16 | O | Output data |
| cfifordy[15:0] | 16 | O | FIFO RDY (READY) (<Channel>, I/E, Req/Stt) |
| mfsel[3:0] | 4 | I | FIFO Select address (<Channel>, I/E, Req/Stt) |
| mfrd | 1 | I | FIFO Read Strobe |
| *DMA Access* | | | |
| cotype[2:0] | 3 | O | Transaction type: 010 — DMA 011 — End of DMA |

MAC/Slicer—Channel Interfaces

Memory Incoming Stream

Figure 5:
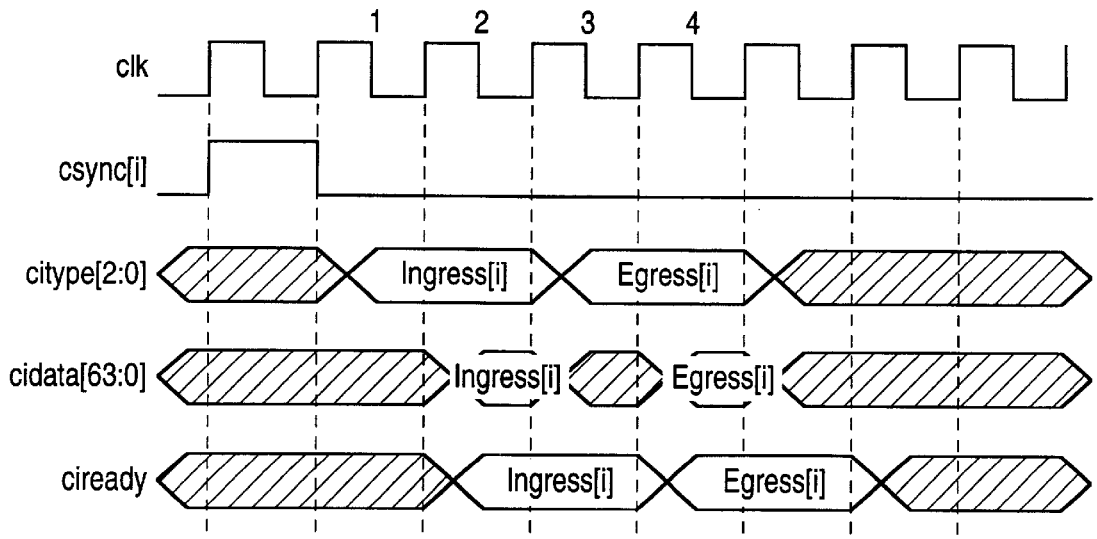

This stream transfers data and status transactions from MAC/slicer receive agents 130RX, 140RX to memory 170 (RX flow). The timing diagram is shown in FIG. 5. Clock cycles 2 and 4 correspond to channel RX cycles 2 and 4 in FIG. 4.

The signals involved include:

csync[3:0] MAC/slicer synchronization strobe; identifies the receive agent 130 RX or 140RX (when combined with time slot information identifying the clock cycle 2 or 4 in FIG. 4); generated by the channel.

citype[2:0] Type of transaction. Generated by the MAC/slicer RX agent for the channel as follows:

000—Not Valid Transaction (NOP)
001—TX Status
010—RX Status
011—Discard the Frame
100—Data word
101—Data Word+ARL
110—NOP+ARL cidata[63:0] (driven by the MAC/slicer)

ciready Channel response indicating whether the channel accepts the transaction. Examples when the channel does not accept the transaction include a data FIFO full condition in a Data Word transaction. If the transaction is not accepted by the channel, the MAC/slicer will repeat the transaction in the next time slot (i.e. 16 clock cycles later).

Memory Outgoing Stream

Figure 6:
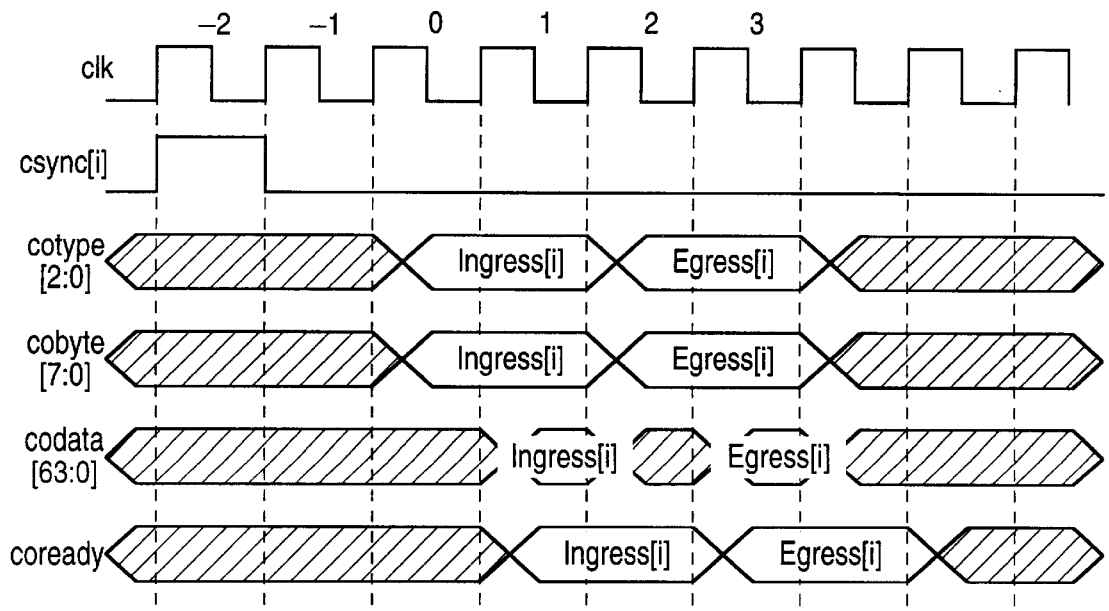

This stream transfers data transactions from memory 170 to MAC/slicer agents 130TX, 140TX (TX flow). The timing diagram is shown in FIG. 6. Clock cycles 1 and 3 in FIG. 6 correspond to cycles 1 and 3 in FIG. 4.

The signals involved include:

csync[3:0] MAC/Slicer time synchronization strobe (the same as for RX flow in FIG. 5)

cotype[2:0] Type of transaction. Generated by the channel for the MAC/slicer as follows:

000—Not Valid (NOP)
001—Command Transfer
011—Program Load Transaction
100—Data Word
101—Last Data Word
110—Discard the Frame codata[63:0]

cobyte[7:0] Byte enable. Every bit cobyte[i] indicates whether the corresponding byte in a data word on the codata bus is valid coready The MAC/slicer response to the channel. If the transaction is not accepted by the MAC/slicer, the channel will repeat the transaction in the next time slot.

Figure 7:
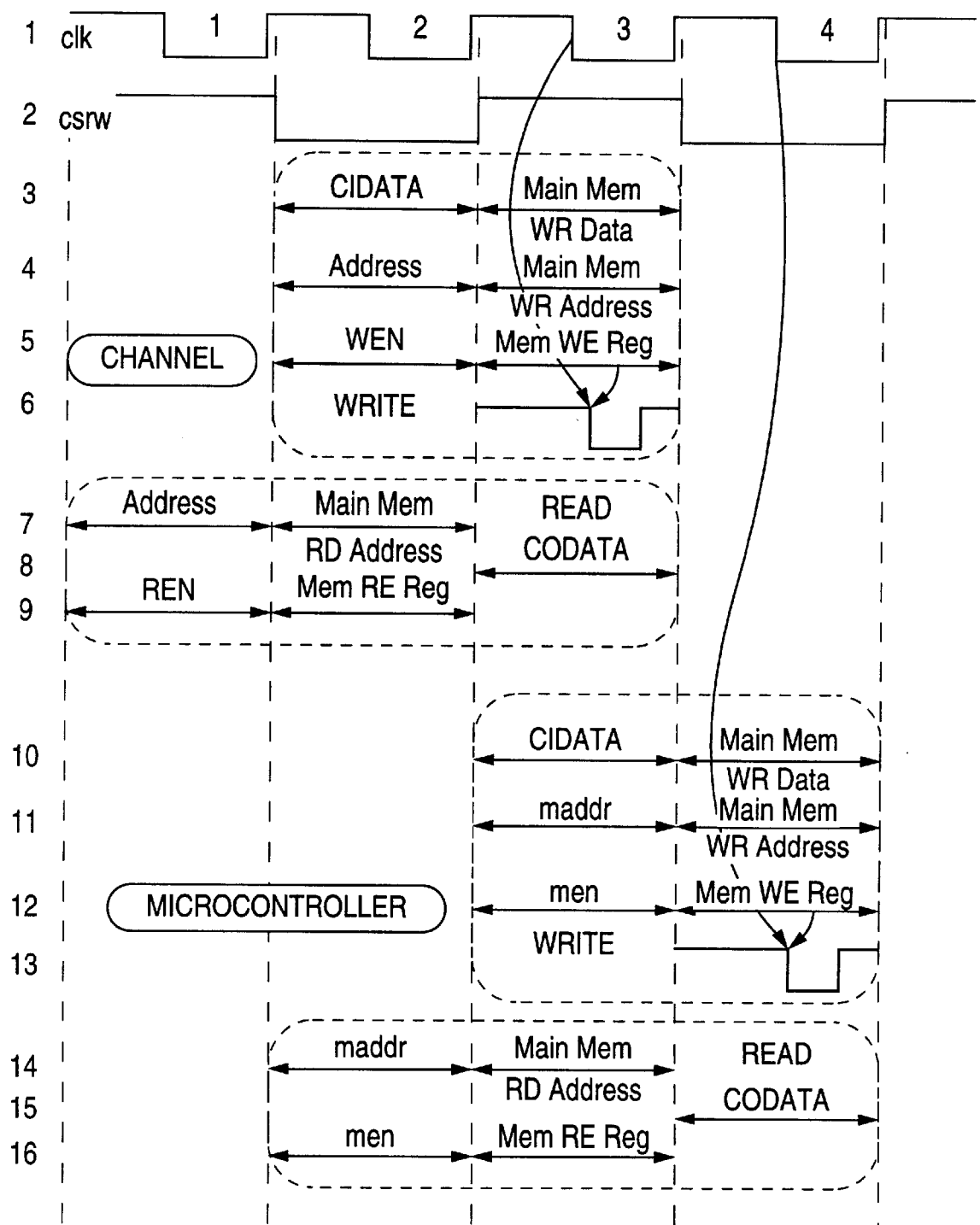

FIG. 7 illustrates other details of the memory 170 access timing. Clock cycles 1, 2, 3, 4 in FIG. 7 correspond to cycles 1, 2, 3, 4 in FIG. 4. The read and write operations are pipelined. In a channel read operation, the channel provides the read address (diagram 7 in FIG. 7) and the read enable signal REN (diagram 9) to memory 170 in clock cycle 1. In clock cycle 2, the address and the read enable are latched in internal memory registers, as indicated by "Main Mem RD address" and "Mem RE Reg". In clock cycle 3, the read data "CODATA" are provided on the Data_Out bus.

The channel write operation is performed in clock cycles 2 and 3. In clock cycle 2, the data CIDATA (diagram 3) are provided on the Data_In bus. In the same cycle, the write address (diagram 4) and the write enable signal WEN are provided to the memory. In cycle 3, the data, the address and the write enable signal are latched in internal memory registers. When the registers have latched the signals, the signal WRITE is pulsed low to enable the data to be written into a memory location. In cycle 4 the data are available to be read out.

Diagrams 10–16 in FIG. 7 show the microcontroller operation timing. In cycle 2, LSU 330 provides to memory 170 the memory address maddr (diagram 14) through address multiplexer 610 (FIG. 3) for a read operation. In the same cycle, the microcontroller asserts the memory enable signal "men". In cycle 3, the address and the memory enable signal are latched in internal memory registers. In cycle 4, the data CODATA are read out to bus Data_Out.

The microcontroller write operation to the memory (diagrams 10–13) is similar to the channel write operation (diagrams 3–6), except that the signal "men" is used instead of WEN.

Signal csrw in each cycle determines whether the microcontroller is allowed to do a memory read or a write.

Figure 8:
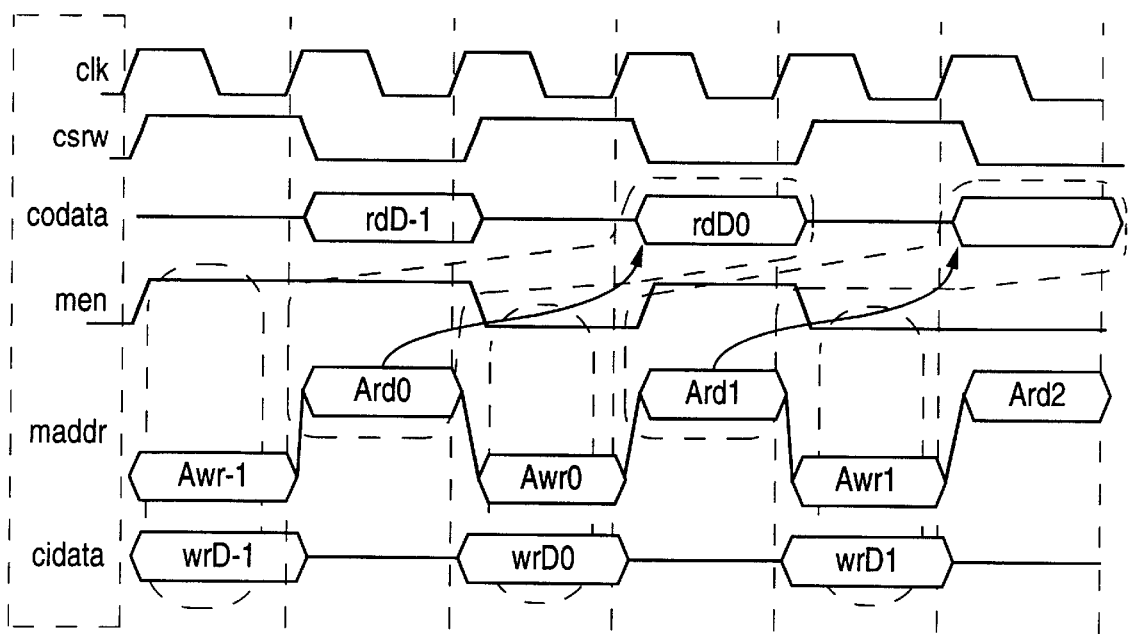

FIG. 8 illustrates an example timing for the microcontroller. Of note, when signal "men" is low, the microcontroller does not access the memory 170. Signal "men" may be driven high or low in any cycle as desired. In contrast, csrw alternates every clock cycle.

In FIG. 8, "rdD" stands for read data; "wrD" for write data; "Ard" for read address; "Awr" for write address.

Command FIFO Interface

When the microcontroller writes to command FIFOs 260 (FIG. 2), the signals "men", "maddr" are not used. Instead, the microcontroller uses signals mfload[7:0] and ccmdfull[7:0] (Table 1). A signal pair mfload[i], ccmdfull[i] is provided for each command FIFO 260. When ccmdfull[i] is low, this means that the corresponding FIFO is not full, and the corresponding mfload[i] can be asserted high by the microcontroller to indicate a write operation. In response, the channel generates the FIFO write address to memory 170, and causes the FIFO to be written from the Data_In bus.

If mfload[i] is high in some clock cycle t, then in the next cycle t+1 the corresponding signal ccmdfull[i] is invalid and cannot be relied on to determine if the command FIFO is full. The signal ccmdfull[i] becomes valid in the following clock cycle t+2.

Request/Status FIFO Access

When the channel writes a request or status FIFO, the channel drives "mfrd" high and also generates the signals mfsel (Table 1) identifying the FIFO. In the next cycle, the corresponding signal cfifordy[i] (FIFO not full) is invalid, but becomes valid on the following clock cycle. The request or status data read out to bus cfifodata are latched on the bus until the next read occurs.

DMA Access

The timing for one word DMA transfer from memory 170 to the microcontroller is similar to that of FIG. 6 in clock cycles −2, −1, 0, 1, except that the operation occurs on the egress side. Further, in the DMA transfers, the signals cobyte and coready are unused.

Data FIFOs

Figure 9:
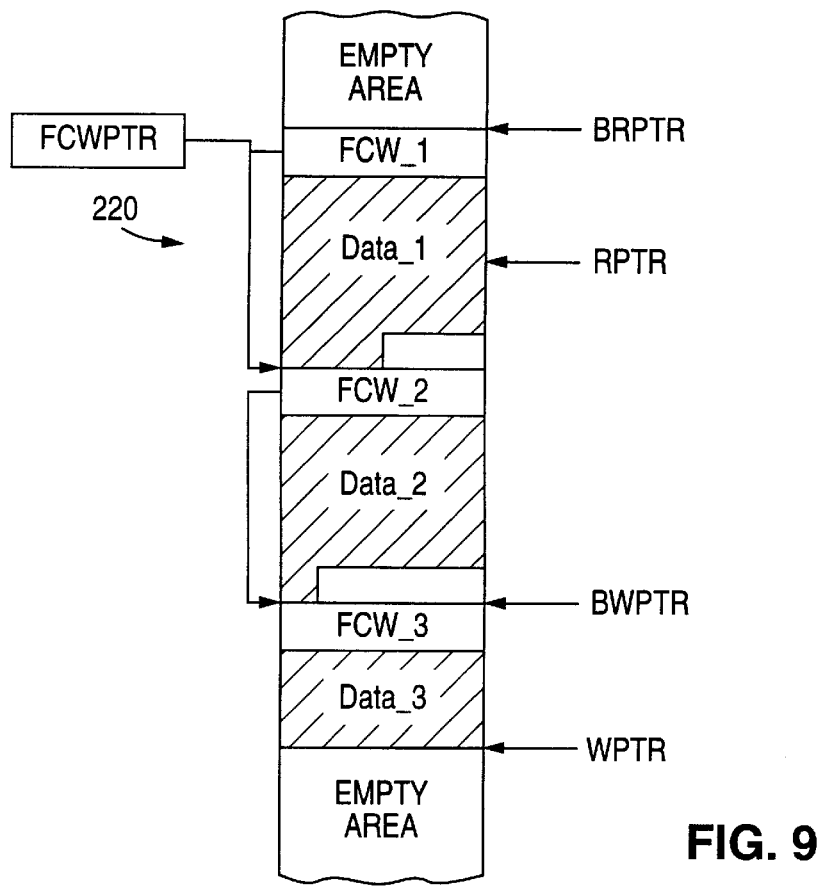
FIG. 9 illustrates a data structure used in the circuit of FIG. 1.

FIG. 9 shows a circular data FIFO 220. Each FIFO entry is 64-bit wide. The first word (64 bits) of each frame in the FIFO is the Frame Control Word (FCW). The MAC/slicer RX agent sends this word to the channel before any frame data, in a "Data Word" transaction (citype=100; see "Memory Incoming Stream" above).

The channel uses the following pointers for each data FIFO 220:

1. Read Pointer (RPTR) points to the word being read (or the next word to be read).

2. Base Read Pointer (BRPTR) points to the beginning of the area which cannot be overwritten in the circular data FIFO. Typically, BRPTR=RPTR. However, if the frame is to be frozen (as specified by the F bit in the "Transfer from Frame Data Area" channel command, described in Addendum 1), then the Base Read Pointer points to the FCW of the frame being read (i.e., the open frame), as shown in FIG. 9. The frame can be retransmitted when RPTR is reloaded from BRPTR.

3. Write Pointer (WPTR) points to the word being written (or the next word to be written).

4. Base Write Pointer (BWPTR) points to the frame control word of the frame being written.

The FCW format is described in Addendum 3. As shown therein, each FCW contains the frame length (FRL) and the pointer to the next frame (NFA). When the entire frame has not yet been received, the two fields FRL and NFA are 0 (this is the case for FCW_3 in FIG. 9). These fields are updated when the frame has been received, by the RX Status transaction described below.

When output control 250 executes a command with the "Open" bit set, the FCW of the frame to which the command relates is transferred to a temporary register FCWPTR (one per data FIFO). If the frame is current (not fully received yet), output control 250 reads the frame data by maintaining a minimal distance (gap) between the Read and Write pointers RPTR, WPTR. (See the CFGR register GAP field in Addendum 3.) The FCW write (the RX Status transaction, citype=010) at the end of the frame receive updates the temporary FCWPTR register and enables output control 250 to read the frame to the end.

If the frame is long (e.g. longer than the data buffer allocated for the data FIFO), the frame FCW location in the data FIFO and the start of the frame can be overwritten by the end portion of the frame.

Frame processing stages are summarized in Addendum 2.

Input Control

MACs 130 and slicers 140 send information to channel 150 in 8-byte transactions. The first transaction for any frame is the initial FCW transaction. The transaction type "citype" is "Data Word" (100); see "Memory Incoming Stream" above. The FCW transaction is followed by Data transfer transactions (type "Data Word"), one of which can be marked by an ARL (address resolution) request marker. The last transaction of the frame is the RX Status transaction.

There are four possible RX cases (see Table 2 below):

(1) Good Short Frame: A good frame is shorter than the ARL threshold. An ARL request (transaction type "Data+ARL" or "NOP+ARL") marks the last data transaction. A Good RX Status transaction (i.e. "RX Status" with "Bad" bit reset, see below) terminates the frame.

(2) Good Long Frame: A good frame is longer than the ARL threshold. An ARL request marks one of the data transactions. Good RX Status terminates the frame.

(3) Bad Short Frame: A bad frame is shorter than the ARL threshold (an ARL request had not been posted when the Bad status was detected). The request FIFO is never written with a request for the frame. A Discard Frame transaction terminates the frame because the frame can be dropped by the channel without microcontroller interference.

(4) Bad Long Frame: A bad frame is longer than the ARL threshold; an ARL request had been posted when the Bad RX Status ("RX Status" with the "Bad" bit set) was performed. Bad RX Status terminates the frame. A request for the frame has been written to the request FIFO, and the frame will be dropped using a command (NOP) from the microcontroller.

TABLE 2

| Case | Transactions | | | | | |
|---|---|---|---|---|---|---|
| Good Short Frame | FCW | Data | ... Data | ... Data | Data + ARL | Good RX Status |
| Good Long Frame | FCW | Data | ... Data + ARL | ... Data | Data | Good RX Status |
| Bad Short Frame | FCW | Data | ... Data | ... Data | Discard Frame | |
| Bad Long Frame | FCW | Data | ... Data + ARL | ... Data | Bad RX Status | |

Figure 10:
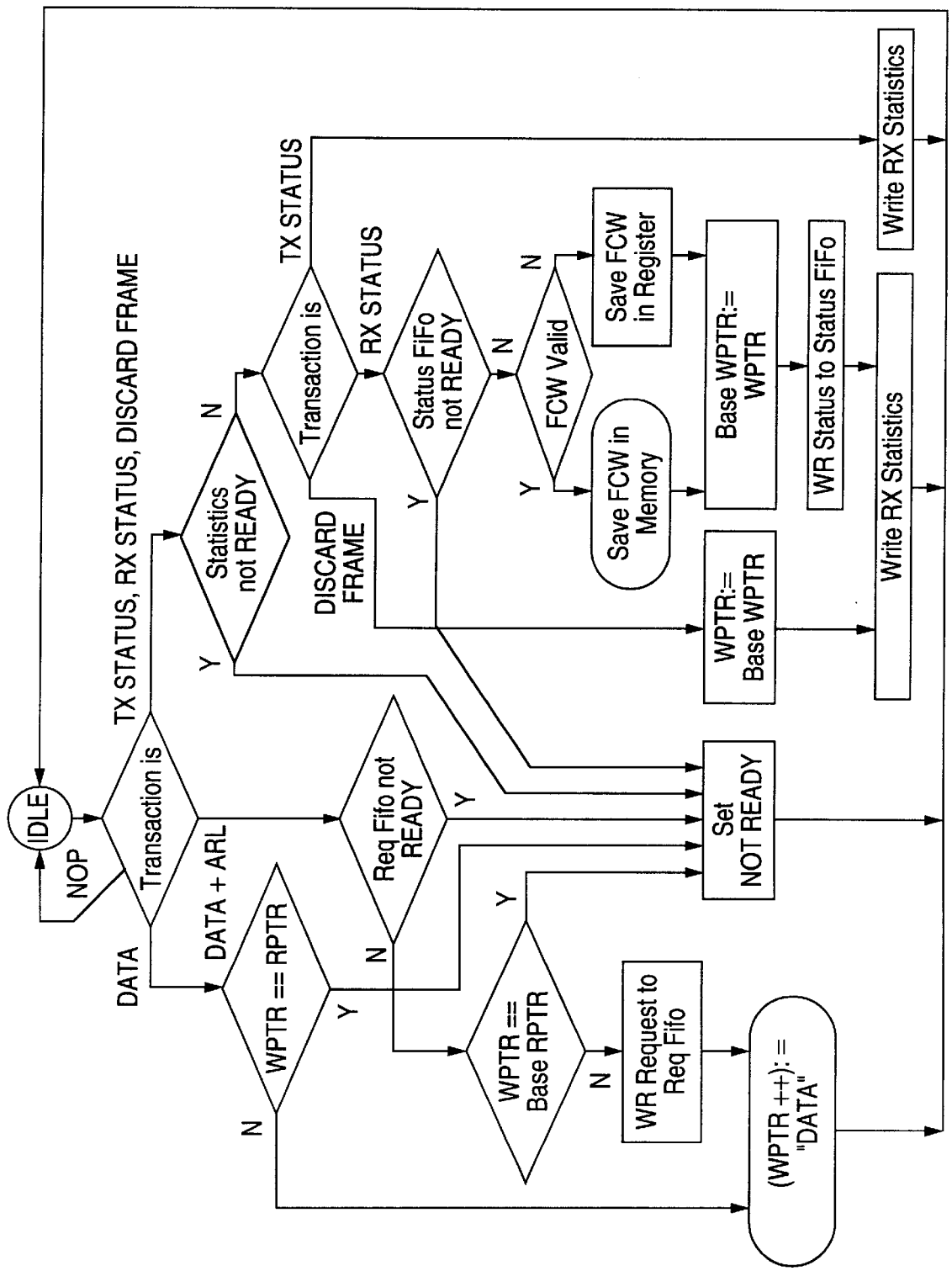
FIG. 10 is a flowchart illustrating operation of the channel processor of FIG. 1.

The channel operation flowchart for the input control is shown in FIG. 10. In that figure, "==" denotes a comparison operation, and "++" denotes incrementation (following the syntax of the programming language C). ":=" denotes an assignment operation.

Initial FCW Transaction Format (citype is "Data Word")

This transaction does not carry any frame data and performs the following functions:

(1) invalidate the FCW in the respective data FIFO 220 in case that TX for the frame will be started before the end of the frame is received;

(2) for egress, write to the FCW the information that will be used for the ARL function (ATM header).

For RX from MACs 130, the 8 bytes of the transaction are 0. For RX from slicers 140, four bytes are 0, and the other four bytes contain the ATM header of the first cell minus the header checksum (i.e., VCI, VPI, GFC, CLP, PTI).

RX Data Transaction Format (citype is "Data Word")

Each data transaction carries up to 8 bytes of the frame data. All data transactions except the last one for the frame use all the eight bytes.

The last transaction can carry from 1 to 8 valid bytes. The valid bytes are contiguous from the start. The number of the valid bytes is identified by three LSBs of the Frame Length field of the RX Status transaction.

RX Status Transaction Format

This transaction is performed when the frame has been received. The transaction fields are shown below. This transaction has the following destinations:

FCW in respective data FIFO 220 if the frame has not been opened yet. The FCW location is identified by BWPTR.

FCW register FCWPTR if the frame has been opened.

Status FIFO 240

Port Statistics collector (not shown)

The following transaction fields are driven by agent 130RX or 140RX: Frame Length, "Bad Frame" flag, and for the egress the ATM header (the same header that was written when the frame was opened).

On the ingress side (from MAC 130), the RX status has four "0" bytes and also the following fields:

| Frame Len | (12 bits) | Length of the Frame (bytes) |
|---|---|---|
| B | (1 bit) | Bad Frame flag (1-BAD) |
| MR2 | (2 bits) | Statistics group 2: |
| | | 01 - Frame is UNICAST |
| | | 10 - Frame is MULTICAST |
| | | 11 - Frame is BROADCAST |
| MR3 | (2 bits) | Statistics group 3: |
| | | 00 - No ERRORs |
| | | 01 - Align ERROR |
| | | 10 - FCS ERROR |
| | | 11 - Overrun ERROR |
| NFPTR | (11 bits) | Next Frame Pointer (Word aligned). This field is driven by the channel during this transaction |

On the egress side, the RX status format is as follows:

| Frame Len | (12 bits) | Length of the Frame (bytes) |
|---|---|---|
| SR2 | (1 bit) | Header Sequence ERROR |
| SR3 | (1 bit) | AAL5 FCS ERROR |
| SR4 | (1 bit) | Memory Parity ERROR |
| SR1CELL | (6 bits) | AAL5 Frame Length (ATM Cells) |
| NFPTR | (11 bits) | Next Frame Pointer (Word aligned). This field is |

-continued

| | | driven by the channel during this transaction |
|---|---|---|
| VCI | (16 bits) | Virtual Channel ID |
| VPI | (8 bits) | Virtual Path ID |
| GFC | (3 bits) | Generic Flow Control |
| CLP | (1 bit) | Cell Loss Priority |
| PTI | (3 bit) | Payload type ID |

Discard Frame Transaction Format

This transaction writes data to the Port statistics collector and releases the space that was occupied by the frame in the data FIFO. The Discard Frame transaction has the same format as the RX status transaction.

TX Status Transaction Format

The TX Status transaction does not belong to the RX flow but uses the RX flow resources citype, cidata, cireadly. On the egress side (from the channel to a MAC), the transaction includes the following fields:

| Frame Len | (12 bits) | Length of the Frame (bytes) |
|---|---|---|
| MT2 | (2 bits) | Statistics group 2: |
| | | 01 - Frame is UNICAST |
| | | 10 - Frame is MULTICAST |
| | | 11 - Frame is BROADCAST |
| MT3 | (2 bits) | Statistics group 3: |
| | | 00 - No ERRORs |
| | | 01 - FCS ERROR |
| | | 10 - Oversized Frame ERROR |
| | | 11 - Underrun ERROR |
| MT4 | (2 bits) | Statistics group 3: |
| | | 00 - No Collisions |
| | | 01 - Single Collision |
| | | 10 - Multiple Collisions |
| | | 11 -Excessive Collision |

On the ingress side (from the channel to a slicer), the transaction format is as follows:

Cell Count (11 bits)—the number of cells in the frame.

Output Control

During transmission the channel sends information to MACs 130 and slicers 140 in 8-byte transactions.

The first transaction for any frame can be a frame mode TX set up transaction (the ATM Header for Slicer, CRC Mode for MAC). The transaction cotype is "Command Transfer". This transaction is performed to execute the channel command "Transfer Immediate Data" (Addendum 1). If this transaction is omitted, the MAC/slicer will use the value from the previous frame, or a default if there was no previous frame.

Then data transfer transactions follow (cotype "Data Word"). Each can carry from 1 to 8 bytes. The actual amount of data is defined by the 8-bit Byte Enable vector cobyte (FIG. 6).

The last transaction for the frame is marked by the cotype value "Last Data". The last valid byte of this transaction is the last byte of the frame.

If the frame should be discarded by the MAC/slicer transmit agent ("bad frame" condition is detected after the transmission has begun), a Discard Frame transaction is performed instead of the Last Data transaction.

Figure 11:
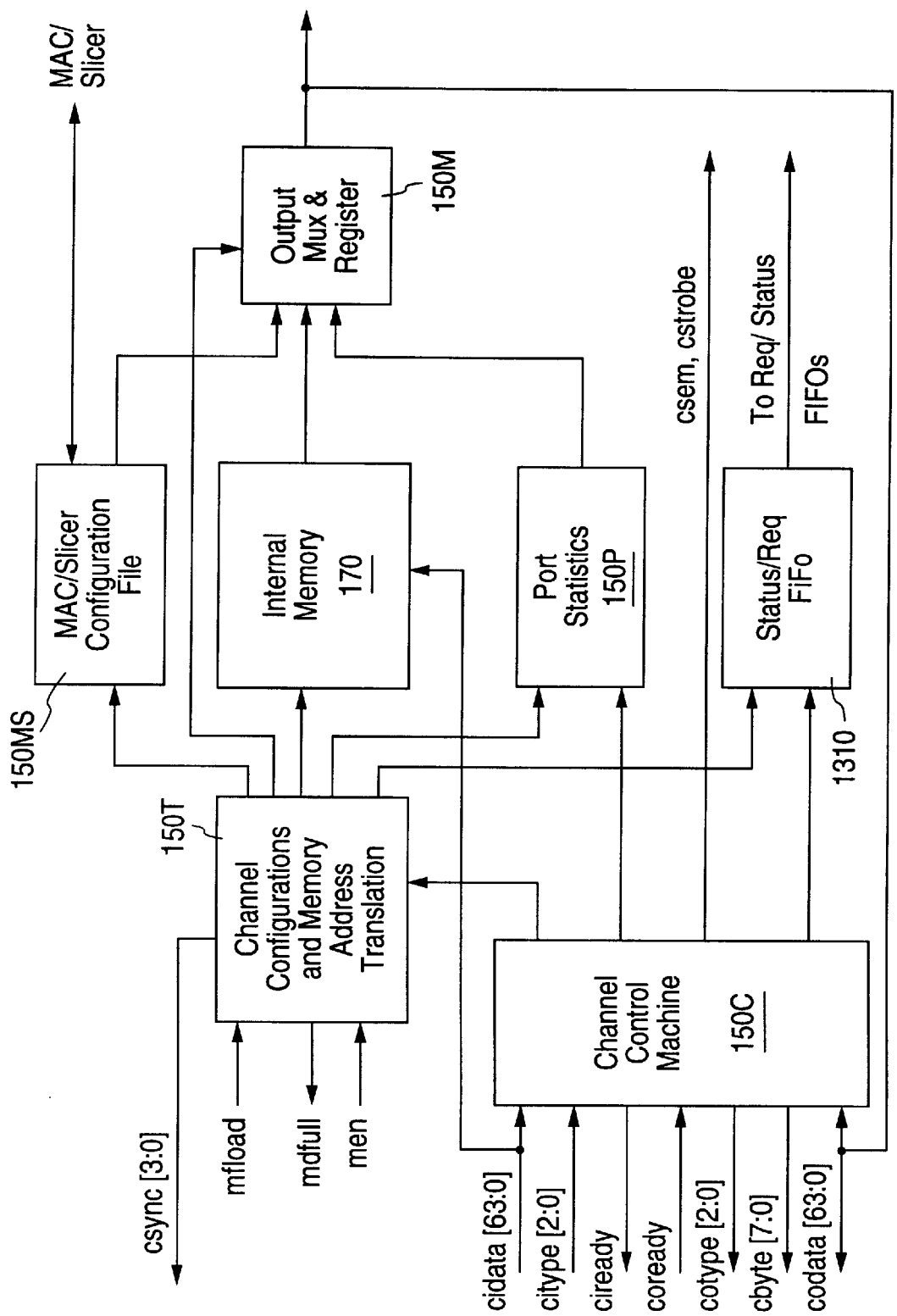
FIG. 11 is a block diagram of the channel of FIG. 1.

FIG. 11 is a detailed block diagram of one embodiment of channel 150. Channel 150 of FIG. 11 performs the functions of input control 210 and output control 250 and other channel functions described above. Channel 150 includes a channel control machine 150C connected to buses cidata, citype, cireadly, coready, cotype, cobyte, and codata. Internal memory 170 is connected to bus "codata" through output multiplexer and register block 150M. This block was omitted from FIG. 3. Besides the memory 170, MUX block 150M has data inputs connected to MAC/slicer configuration file 150MS and to port statistics collector 150P. MAC/slicer configuration file 150MS includes MAC and slicer configuration registers and is connected to MACs 130 and slicers 140. Channel configurations and memory address translation block 150T has outputs connected to MAC/slicer configuration file 150MS, block 150M, internal memory 170, port statistics collector 150P, and status/request FIFO interface 1310. The block 150T output connected to internal memory 170 includes the address buses shown as Addr_In, Addr_Out in FIG. 3 and also includes the control signals such as REN, WEN (FIG. 7). Channel control machine 150C has outputs connected to block 150T, port statistics collector 150P, and block 1310. In addition, channel control machine 150C has an indication output csem, cstrobe (see Table 1 above) connected to microcontroller 160.

Block 150T has output csync[3:0] connected to MACs 130 and slicers 140 and described above in connection with FIGS. 5 and 6. In addition, block 150T is connected to lines mfload, ccmdfull (Table 1). Block 150T also receives signal "men" (memory enable) from microcontroller 160 (FIG. 7).

Channel control machine 150C has an output connected to block 150T.

Memory 170 address translation is performed by block 150T as follows. Block 150T stores the channel configuration registers CFGR (Addendum 3) for each sub-channel 150I, 150E. The channel configuration registers provide the base address and the length of each command and data buffer allocated for the respective command or data FIFO. Channel control machine 150C and the microcontroller access the data and command FIFOs using a logical (relative) address RA (see Addendum 3, Section A1) which is the offset from the base address. If the logical address is larger than the length of the respective command or data buffer, wrap-around occurs.

Figure 12:
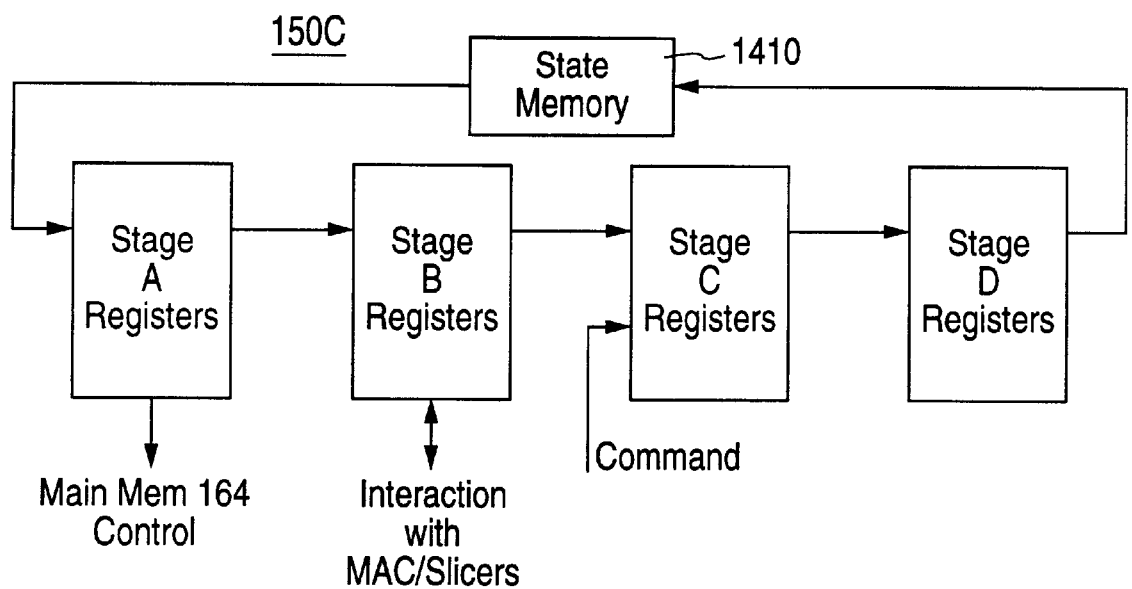
FIG. 12 is a detailed block diagram of a portion of the channel of FIG. 11.
Figure 13:
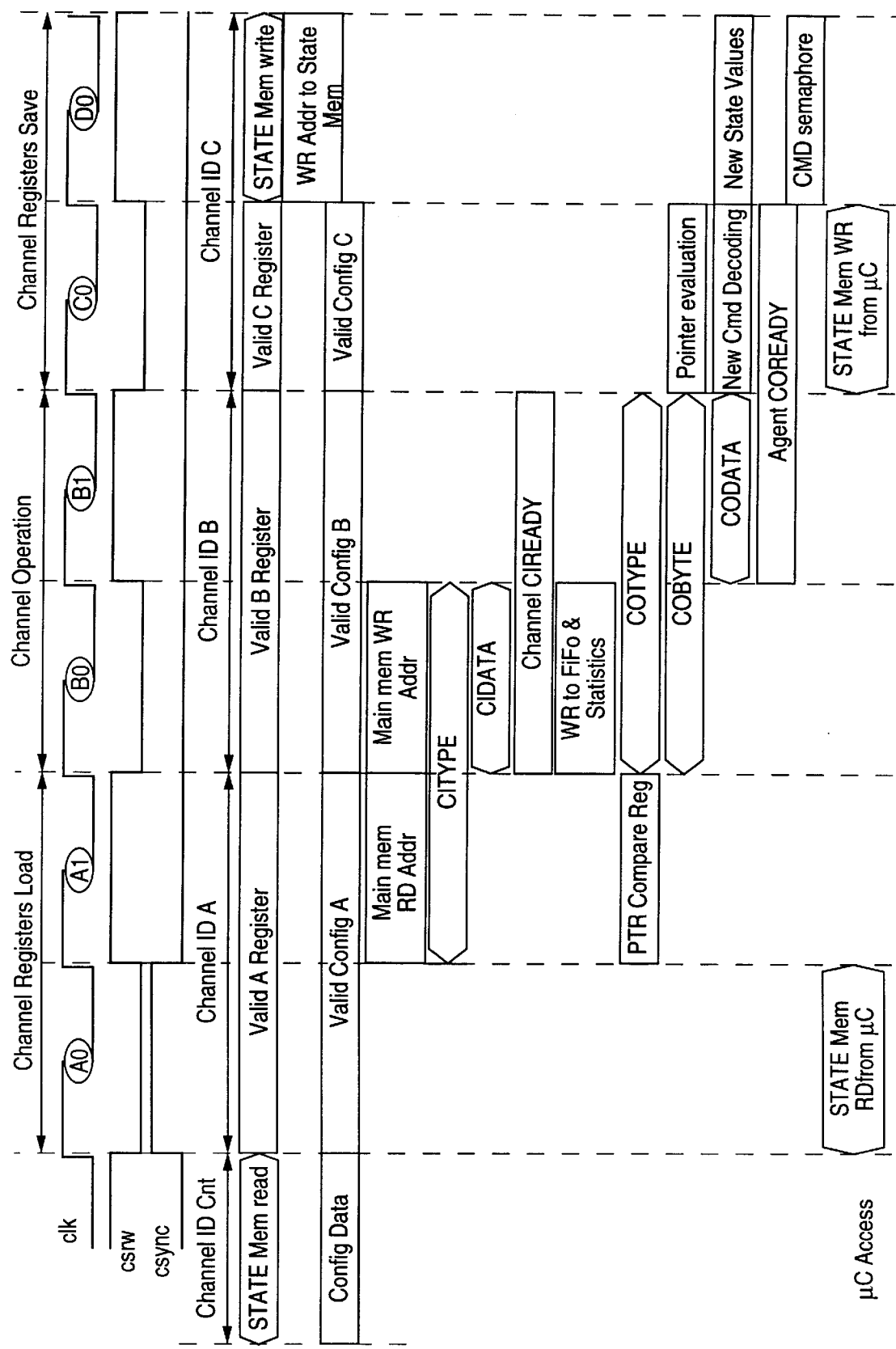
FIG. 13 is a timing diagram for the channel of FIG. 1.

FIG. 12 illustrates the data flow pipeline for the channel control machine 150C. The channel control machine 150C services each sub-channel 150I, 150E in two clock cycles, for a total of 16 cycles. Each of stages A, B, C, D of FIG. 12 takes one or two clock cycles as shown in FIG. 13. The remaining cycles are taken by state memory 1410. Memory 1410 and Stage A, B, C and D registers of FIG. 12 are part of channel control machine 150C.

In FIG. 13, channel registers load operations occur at stage A and take clock cycles A0, A1; channel operation stage B takes cycles B0, B1; and channel registers save operations occur at stage C (clock C0) and D (clock D0).

In the clock cycle before A0, the state memory 1410 is read. The state memory output is loaded into stage A registers. In clocks A0, A1, the A registers are valid as indicated in FIG. 13.

Also in the cycle immediately preceding A0, the configuration data are read including the base and length of the data and command FIFOs.

In clock A1, the channel drives the memory read address to memory 170 (see FIG. 7, diagram 7, clock cycle 1), and in clock B0 the channel drives the memory write address (diagram 4, cycle 2 in FIG. 7).

In clocks A1 and B0, an agent 130RX or 140RX drives CITYPE (that is, citype).

The channel responds with the signal CIREADY (the same as ciready). In cycle B0, the agent drives the data CIDATA (the same as cidata).

If the channel accepts the data, the channel writes the appropriate FIFO and the port statistics collector in cycle B0.

On the channel output side, the FIFO pointer comparison ("PTR Compare Reg") is made in cycle A1 to determine if the destination FIFO is full. In cycles B0, B1, the channel drives to an agent signals COTYPE (the same as cotype) and COBYTE (the same as cobyte). Memory 170 drives the data CODATA (the same as codata) in cycle B1. In cycles B1, C0, the agent drives COREADY (the same as coready) indicating whether the agent accepts the data. Then the new pointer values are determined in clock cycle C0 ("pointer evaluation"), and saved in cycle D0.

When one of the sub-channels 150I, 150E is in cycle B0, another sub-channel is in cycle A0.

The embodiments described herein do not limit the invention. In particular, the invention is not limited by the number of ports, or by ports being full- or half-duplex, or by any timing, signals, commands or instructions. In some embodiments, the software executed by the microcontroller is loaded from a disk, RAM, or some other device, perhaps via a network. The software may be called firmware or some other name. Other embodiments and variations are within the scope of the invention, as described by the appended claims.

ADDENDUM 1

Channel Commands

This addendum describes commands executed by output control 250. Each command FIFO entry has 64 bits, but some bits may be unused. Command codes identifying the commands are omitted in the description below.

Transfer from Scratch Pad Area—transfer data from a buffer in the Scratch Pad Area of memory 170. The command bits are as follows.

O (1 bit) Open Frame (=1-Open). When set, this bit causes output control 250 to open the next frame in the corresponding Data FIFO, i.e. to read the Frame Control Word into FCWPTR. If the frame is bad, it will be removed from the FIFO and all the commands till the last one for this frame (the last command is identified by the C bit set) will be skipped.

C (1 bit) Close Frame (=1-Close). When set, indicates the end of the frame.

ADDR (11 bits) Scratch Pad memory location (byte aligned)

LENGTH (7 bits) Number of bytes to transfer (minimum 1, maximum 64)

I (1 bit) Indication bit. When set, indication to the microcontroller is generated after the completion of this command. The indication number is equal to the scratch pad block address (ADDR[10:6]).

Transfer from Control Area—transfer data from the control area of internal memory 170.

| O | (1 bit) | Open Frame (=1-Open) |
|---|---|---|
| C | (1 bit) | Close Frame (=1-Close) |
| ADDR | (12 bits) | Control area memory location (byte aligned) |
| LENGTH | (7 bits) | Number of bytes to transfer |

The memory address A from which the data are transferred is generated as follows:

A[16]=1; A[15:14]=CHID; A[13]=ADDR[11]=I/E;
A[12:11]=0; A[10:0]=ADDR[10:0]; where:
CHID (2 bits) Channel Id (0, 1, 2 or 3 for respective channels 150.0, 150.1, 150.2, 150.3)

I/E (1 bit) Ingress (0)/Egress (1)

Transfer from Frame Data Area—transfer data from a data FIFO using the current read pointer RPTR.

O (1 bit) Open Frame (=1-Open). When set, output control 250 opens the next frame in the Data FIFO, i.e. reads the Frame Control Word into FCWPTR. If the frame is bad, it will be removed from the FIFO and all the commands till the last one for this frame (identified by the C bit set) will be skipped.

In addition, the O bit set causes the Read pointer to be set to the current Base Read pointer.

| C | (1 bit) | Close Frame (=1-Close) |
|---|---|---|
| F | (1 bit) | Freeze Base Read pointer |
|   | 0 - Don't freeze | |
|   | 1 - Freeze | |

If the F bit is set, BRPTR is not changed even if the O bit is also set. Hence, the frame pointed to by BRPTR is not removed from the data FIFO and can be retransmitted if the read pointer RPTR is reloaded later with the BRPTR value.

P (1 bit) Load Program

When set, the data will be directed to the program memory instead of the MAC (valid only for egress processing).

OFFSET (10 bits) Offset relative to the current Read pointer (byte aligned).

| L | (1 bit) | Length bit |
|---|---|---|
| 0 - transfer LENGTH bytes (see below) | | |
| starting from Read pointer plus offset | | |
| (RPTR+OFFSET) | | |
| 1 - transfer from RPTR+OFFSET till the end | | |
| of the frame minus LENGTH bytes | | |
| LENGTH (7 bits) Number of bytes | | |

Transfer Immediate Data—transfer up to 6 bytes of immediate data to a MAC or a slicer. This command can be used for transferring control information to a MAC or a slicer.

| BYTES | (6 bytes) | immediate data |
|---|---|---|
| O | (1 bit) | Open Frame (=1-Open) |
| C | (1 bit) | Close Frame (=1-Close) |
| TYPE | (4 bits) | Immediate Data type |

0000—Immediate Data
0001—Frame Mode Register (ATM Header for Slicer or CRC mode for MAC)

These bits can also be used to indicate to the MAC (1) to start CRC computation; (2) to finish CRC computation; and (3) to append or not to append the CRC at the end of the frame.

MASK (6 bits) Byte valid (each bit indicates whether the respective BYTE is valid)

NOP

This command is used to send an indication to the microcontroller. When both the "O" and the "C" bits are set, this command is used to skip the frame in the Data FIFO. When this command is used for indication, both the "O" and the "C" bits should be reset.

| O | (1 bit) | Open Frame (=1-Open) |
|---|---|---|
| C | (1 bit) | Close Frame (=1-Close) |
| IND | (5 bits) | Indication Number (0 to 31) |
| S | (1 bit) | Semaphore bit. When set, |
| indication to the microcontroller is generated | | |
| which will set the semaphorebit #IND. The | | |
| channel drives the indication number IND on the | | |
| csem lines for one clock cycle, and in the same | | |
| cycle asserts cstrobe (Table 1) to the | | |
| microcontroller. | | |

ADDENDUM 2

Frame Transfer Stages

In order to discard a frame, the microcontroller writes the discard command (NOP with O=C=1) to the respective command FIFO. To execute the command, the channel checks the respective FCWPTR register to determine if the frame FCW is valid. If the FCW is valid, the channel sends a discard transaction (cotype is "Discard the Frame") to cause the transmit agent 130TX or 140TX to discard the frame. If the FCW is invalid, output control 250 sends NOP transactions until the input control 210 receives the entire frame and updates the FCWPTR with a valid FCW. Then output control 250 sends a "Discard the Frame" transaction.

Figure 14:
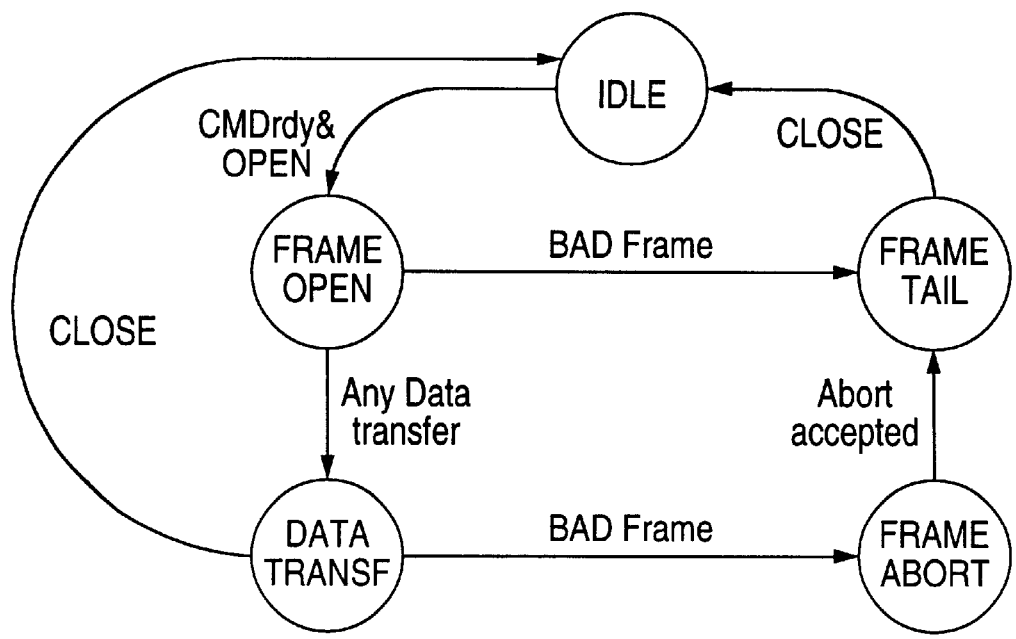
FIG. 14 is a state diagram showing frame transfer stages in the circuit of FIG. 1.

FIG. 14 illustrates the frame transfer stages. When the channel executes a command with the O bit set, the channel moves from the IDLE state to FRAME OPEN. When the channel transfers any data for the frame to a transmit agent, the channel moves to state DATA TRANSF ("data transfer"). Data transfers continue in that state until the channel executes a command with the C (CLOSE) bit set. This command transfers the channel back to the IDLE state.

If the channel discovers in the FRAME OPEN state that the frame is bad and has to be discarded, the channel moves to FRAME TAIL. Since the transmit agent has not gotten any data for the frame, the channel does not have to send a "discard the frame" transaction to the transmit agent. The channel simply skips all the commands for the frame until the command with the C bit set. (This is not needed if the frame is being discarded in response to the microcontroller NOP command because the NOP command itself will have its C bit set; however, if the frame is being discarded in response to the RX status transaction from the receive agent, some microcontroller commands may have to be skipped). Then the channel moves to the IDLE state.

If the channel discovers in the DATA TRANSFER state that the frame is bad, the channel moves to FRAME ABORT. In that state, the channel sends a "discard the frame" transaction to the transmit agent, and thus moves to FRAME TAIL in order to discard commands as described above.

The following table illustrates whether the channel is sensitive to "coready" for different channel commands at different frame transfers stages. Of note, when the channel is reading the command FIFO both the channel and the transmit agent decode the command. If the command is "Transfer Immediate Data", the transmit agent reads the immediate data from the Data_Out bus, while the channel ignores the data.

| Command | Frame transfer stage | CMD Access | | DATA Access | |
|---|---|---|---|---|---|
| | | cotype | coready | cotype | coready |
| DATA Area, Scratch PAD Area or Control Area transfer CMDs | IDLE | CMD | ignore | | |
| | FRAME OPEN | CMD | ignore | | |
| | DATA TRANSFER | CMD | ignore | DATA | sensitive |
| | FRAME ABORT | DSCRD | sensitive | DSCRD | sensitive |
| | FRAME TAIL | NOP | ignore | | No DATA Transfers |
| Transfer Immediate DATA | IDLE | CMD | sensitive | | Not applicable |
| | FRAME OPEN | CMD | sensitive | | |
| | DATA TRANSFER | CMD | sensitive | | |
| | FRAME ABORT | DSCRD | sensitive | | |
| | FRAME TAIL | NOP | ignore | | |
| NOP | IDLE | CMD | ignore | | Not applicable |
| | FRAME OPEN | CMD | ignore | | |
| | DATA TRANSFER | CMD | ignore | | |
| | FRAME ABORT | DSCRD | sensitive | | |
| | FRAME TAIL | NOP | ignore | | |

ADDENDUM 3

Memory

A. Map of Internal Memory 170

Figure 15:
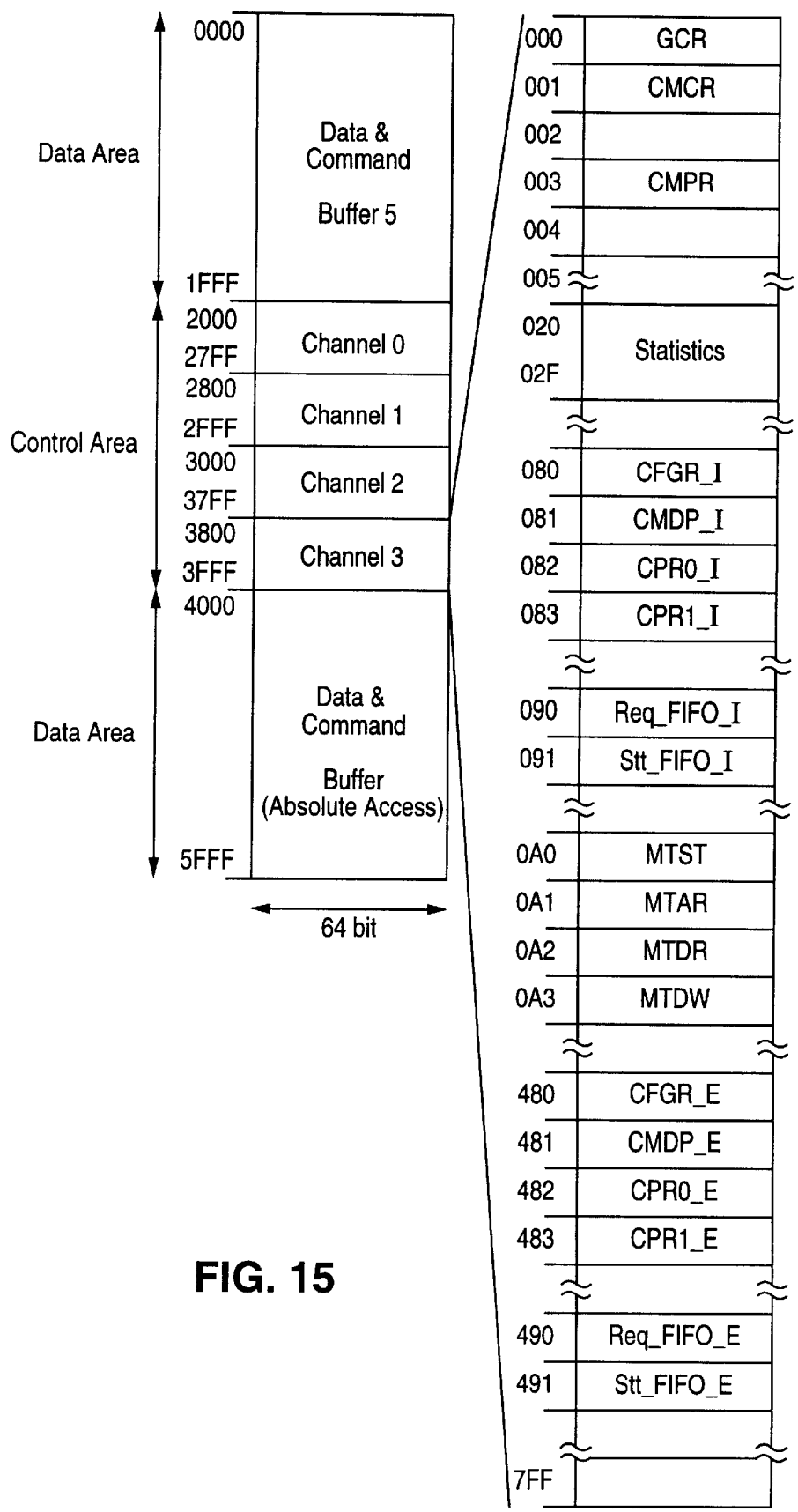
FIG. 15 is a memory map for the circuit of FIG. 1.

The internal memory map is shown in FIG. 15.

A1. DATA AREA (ADDRESS 0000–1FFF HEX)

This area is used for the Scratch Pad and the Data and Command FIFOs. This area is accessed using relative addresses. The data area memory map is shown in FIG. 16.

Figure 16:
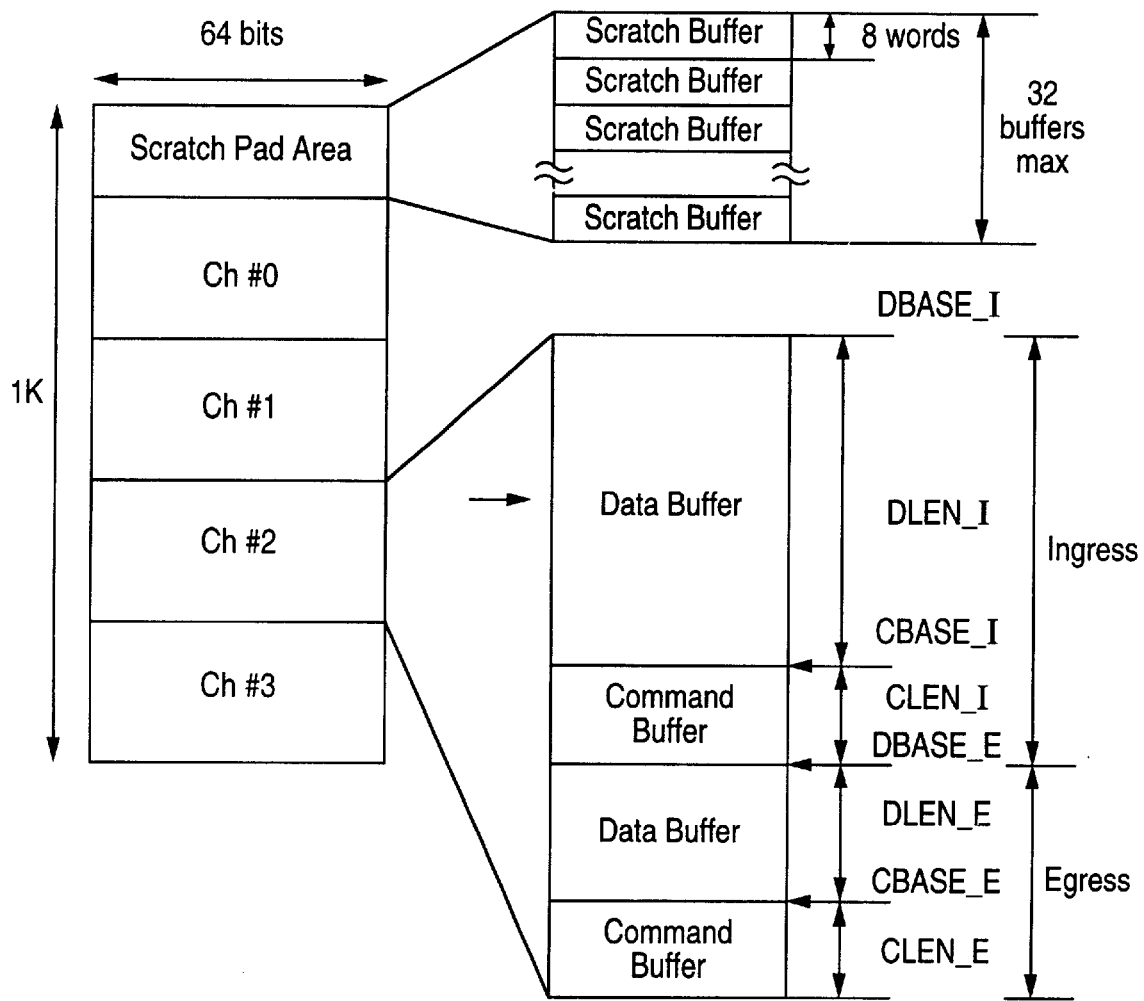
FIG. 16 is a data area memory map for the circuit of FIG. 1.

In FIG. 16, "DBASE_I" is the "DBASE" field of the CFGR register (described below) for the ingress side. Similarly, DLEN, CBASE, CLEN are fields of the corresponding CFGR register. The suffix "_I" stands for ingress, and "_E" stands for egress.

A2. CONTROL AREA FOR EACH CHANNEL

Some of the registers in this area are as follows.

CFGR—Channel Configuration Register (Ingress & Egress)

There are 8 CFGR registers, one per direction of each channel. Their fields are:

| DBASE | (9 bits) | Data Buffer Base Pointer (64 bytes aligned) |
|---|---|---|
| DLEN | (7 bits) | Data Buffer Length (64 bytes granularity) |
| CBASE | (9 bits) | Command Buffer Base Pointer (64 bytes aligned) |
| CLEN | (3 bits) | Command Buffer Length (64 bytes granularity) |
| GAP | (4 bits) | Minimum gap between Data Read and Write pointers when the Frame Control Word is invalid (8 bytes granularity) |

CMCR—MAC Control Register

This register controls the operation of the MAC. There are four CMCR registers, one per MAC. The register fields are:

| ARBN | (4 bits) | Address Resolution request Burst Number. AR Request is generated after 16*ARBN bytes are received. ARBN = 0 is invalid. |
|---|---|---|
| FXM | (2 bits) | Full duplex Mode |
| LB | (1 bit) | Loopback (0-no Loopback; 1-Loopback) |
| RE | (1 bit) | Receive Enable |
| TE | (1 bit) | Transmit Enable |

A3. DATA AREA (ADDRESS 4000–5FFF HEX)

This area is accessed using absolute addresses.

CMDP—Channel Command Port (Ingress & Egress)

This register is a write only port to the command FIFO. There is a separate CMDP register for each command FIFO. These registers are shown in FIG. 15 as CMDP_I (for ingress), CMDP_E (for egress).

Each of these registers has only one field:

CMD (64 bits) Command

Request FIFO Registers

These register are write-only ports to the respective request FIFOs. Each of these registers has one field:

FPTR (9 bits) Frame Pointer (8 bytes aligned)

Status FIFO Registers

These registers are write-only ports to the respective status FIFOs.

The register fields are:

| FRL | (15 bits) | Frame Length (bytes) |
|---|---|---|
| B | (1 bit) | =0 - Frame is Good; =1 - Frame is Bad |

B. Request and Status Memory 230, 240

Each of Request and Status FIFOs is a circular buffer of a fixed length (eight 16-bit entries).

C. Frame Control Word format

FCW for a frame received from MAC (ingress)

| FRL | (15 bits) | Frame Length |
|---|---|---|
| B | (1 bit) | Bad Frame |
| MRG3 | (2 bits) | MAC Receive Statistics Group 3 |
| | 00 | - No Errors |
| | 01 | - Alignment Error |
| | 10 | - FCS Error |
| | 11 | - Overrun Error |
| MRG2 | (2 bits) | MAC Receive Statistics Group 2 |
| | 01 | - Unicast Frame |
| | 10 | - Multicast Frame |
| | 11 | - Broadcast Frame |
| NFA | (11 bits) | Next Frame Address (64 bit aligned, i.e. the 3 LSBs are not included). |

FCW for a frame received from slicer (egress)

| FRL | (15 bits) | Frame Length |
|---|---|---|
| B | (1 bit) | Bad Frame |
| SRG4 | (1 bit) | Slicer Receive Statistics Group 4 - Header Sequence error |
| SRG3 | (1 bit) | Slicer Receive Statistics Group 3 - AAL5 FCS error |
| SRG2 | (1 bit) | Slicer Receive Statistics Group 2 - AAL5 Length error |

-continued

| | | |
|---|---|---|
| NFA | (11 bits) | Next Frame Address (64 bit aligned) |
| ATMH | (32 bits) | ATM Header (minus the header checksum) |

ADDENDUM 4

Slicer

The registers in the slicer are accessed through the header lines from the ATM switch. The header lines are described in U.S. Pat. No. 5,440,523 issued Aug. 8, 1995 and incorporated herein by reference.

| SSMR — Slicer Secondary Mode Register | | |
|---|---|---|
| ARBN | (4 bits) | Address Resolution request Burst Number. AR Request is generated after 16*ARBN bytes are received. ARBN = 0 is invalid. |
| CSE | (1 bit) | Channel Split Enable (E0, E1, I0, I1) |
| PF1 | (1 bit) | PIF-1 mode of operation |
| 16B | (1 bit) | 16B mode enables spread of a single column of VIX between 2 MBUF chips (0—disabled; 1—enabled). VIX (Trademark) is the interconnection matrix architecture described in U.S. Pat. No. 5,440,523. The MBUF chips are memory buffers described in that patent. |
| FC | (1 bit) | Tx Buffer Full mode 0 — Full indication when buffer cannot get any more cells (completely full). 1 — Full indication when buffer can get one more cell (almost full). |
| PR | (1 bit) | Program Ready |
| BRD | (1 bit) | Bootstrap ROM Disable |
| MPE | (1 bit) | Memory Parity Check 0 — disabled 1 — enabled |

This register is not affected by the Software Rest.

What is claimed is:

1. A network processor system comprising:

a circuit C1 for receiving network data units flowing sequentially between a network port and a network switch, writing the network data units into a first queue, and for generating requests to process the data units, wherein each data unit has first address information specifying the data unit's destination;

a first circuit operable to execute computer instructions to (i) receive said requests, (ii) read portions of the data units corresponding to the requests, (iii) determine based on said portions whether and how the data units are to be transformed, (iv) generate commands specifying how the data units are to be transformed, and (v) write the commands to a memory, wherein the first circuit is programmable with said computer instructions to read at least portions of the first address information from the data units, to determine second address information, and generate commands specifying that the second address information is to be supplied for the data units when the data units are transferred to the network port or the network switch; and a second circuit for reading the commands from the memory and executing the commands to transfer the data units to the network port or the network switch, wherein the memory is operable to contain a plurality of commands which have been written to the memory by the first circuit but have not yet been executed by the second circuit;

wherein the circuit C1 is operable to write a data unit into the first queue in parallel with the first circuit executing said computer instructions and in parallel with the second circuit executing said commands.

2. The network processor system of claim 1 wherein the commands the second circuit is capable of executing include:

(A) one or more commands each of which is a command to transmit data from the first queue; and (B) one or more commands each of which is a command to transmit data which are specified by the one or more commands and which are not part of the received data.

3. The network processor system of claim 2 wherein the only commands the second circuit is capable of executing are the commands (A) and (B).

4. The network processor system of claim 2 wherein the one or more commands (A) include at least one of:

a command to transmit a predetermined length of the received data starting at the beginning of the received data that has not yet been acted on with a command or, alternatively, skipping a portion of the received data and starting at the end of the skipped data; and a command to transmit data from a data unit until the end of the data unit or until a predetermined length from the end of the data unit, wherein the transmission operation is to start at the beginning of the received data that has not yet been acted on with a command or, alternatively, the transmission operation is to skip a portion of the received data and to start at the end of the skipped data.

5. The network processor system of claim 2 wherein the one or more commands (B) include at least one of:

a command to transmit data included in the command; and a command to transmit data stored in memory.

6. The network processor system of claim 1 wherein the commands the second circuit is capable of executing include commands to transmit a portion of the received data, to skip some of the received data and not to transmit such data, and to send data specified by the first circuit which are not part of the data units, thereby enabling data to be inserted into the received data units and deleted from the received data units when data are transmitted.

7. The network processor system of claim 1 wherein the first circuit is programmable to perform address resolution for the received data.

8. The network processor system of claim 1 wherein the first and second circuits are operable to process different data flows so that while the first circuit processes one data flow the second circuit processes the same data flow or a different data flow.

9. The network processor system of claim 1 wherein the second circuit either (i) has no capability to understand the format of received or transmitted data, or (ii) has no capability to understand the format of received or transmitted data except the capability to determine a beginning or an end of a data unit.

10. The network processor system of claim 1 further comprising a search machine capable of operating in parallel with the first and second circuits, the search machine being for performing data base searches using keys supplied by the first circuit.

11. The network processor system of claim 1 wherein the first circuit is operable to execute said computer instructions for multiple data units in parallel.

12. The network processor system of claim 1 comprising circuitry for maintaining a queue of the commands in the memory, wherein the first circuit is programmable with said computer instructions to write the commands to the queue of commands and the second circuit is operable to read the commands from the queue of commands.

13. The network processor system of claim 1 wherein the first circuit is programmable with software prepared before the first circuit begins operation, the software comprising said computer instructions; and wherein the second circuit is not programmable with software prepared before the second circuit begins operation.

14. The network processor system of claim 13 wherein the first address information includes a first layer destination address and a second layer destination address; and wherein the first circuit is programmable, with software prepared before the first circuit begins operation, to read the first layer destination address to obtain the second address information, and the first circuit is programmable, with software prepared before the first circuit begins operation, to read the second layer destination address to obtain the second address information, such that for a given data unit, the first circuit is programmable, with software prepared before the first circuit begins operation, to perform address translation based on the first layer destination address, and is alternatively programmable, with software prepared before the first circuit begins operation, to perform address translation based on the second layer destination address.

15. The network processor system of claim 14 wherein the first layer destination address is a layer-2 address, and the second layer destination address is an IP address.

16. The network processor system of claim 13 wherein the first circuit is programmable, with software prepared before the first circuit begins operation, to restrict traffic based on the first address information.

17. The network processor system of claim 1 wherein the circuit C1, the first circuit, and the second circuit are part of an integrated circuit.

18. A network processor system comprising:
circuitry for maintaining a first FIFO, a second FIFO, and a third FIFO;
a circuit C1 for receiving a first flow of network data units, for writing the network data units to the first FIFO, and for writing to the third FIFO a request to process each data unit;
a first circuit for (i) reading the requests from the third FIFO, (ii) generating, in response to the requests, commands defining whether and how the data in the first flow are to be transformed and sequentially transmitted outside of the network processor system, and (iii) writing the commands to the second FIFO; and
a second circuit for executing the commands in the second FIFO to transform and transmit the data in the first flow.

19. The network processor system of claim 18 wherein the circuit C1 is for writing the network data units to the first FIFO in parallel with the first circuit processing said requests and in parallel with the second circuit executing said commands.

20. The network processor system of claim 18 wherein the circuit C1 is for writing the network data units to the first FIFO in parallel with the first circuit processing said requests, and the first circuit comprises a computer processor executing computer instructions to process said requests, the computer processor being operable to process requests for multiple data units in parallel.

21. The network processor system of claim 18 wherein the first circuit is software programmable, and the first circuit comprises circuitry for reading the software from a memory operable to store the software before operation of the first circuit begins, but the second circuit is not software programmable.

22. The network processor system of claim 18 wherein said circuitry for maintaining the first, second and third FIFOs comprises circuitry for maintaining a pointer defining the beginning of the first FIFO.

23. The network processor system of claim 22 wherein the second circuit is operable to execute a command to transmit an amount of data from the first FIFO starting with the data defined by said pointed, wherein the amount of data to be transmitted is defined by a parameter of the command.

24. The network processor system of claim 22 wherein the second circuit is operable to execute a command to transmit an amount of data from the first FIFO starting at an offset relative to said pointer, the offset being defined by a parameter of the command.

25. The network processor system of claim 22 wherein the second circuit is operable to execute a command to transmit an amount of data from a data unit in the first FIFO starting at an offset relative to said pointer until a length of data from the end of the data unit, the offset and the length of data being defined by parameters of the command.

26. The network processor system of claim 18 wherein the second circuit is operable to execute a command to transmit, to the output, data other the data in the first FIFO.

27. The network processor system of claim 18 further comprising a third circuit operable to search a database by a key provided by the first circuit, wherein the third circuit is operable to search the database for one of the data units while the first circuit processes a request for another one of the data units.

28. The network processor system of claim 18 wherein the first flow is to arrive at the circuit C1 via a first network port and to be transmitted by the second circuit to a device which segments data before the data are switched by a network switch.

29. The network processor system of claim 18 wherein the circuit C1 is to receive the first flow from a data reassembly device, and the first flow is to be transmitted by the second circuit to an output coupled to a first network port.

30. The network processor system of claim 18 wherein:
the first FIFO is one of a plurality of first FIFOs, the second FIFO is one of a plurality of second FIFOs, and the third FIFO is one of a plurality of third FIFOs;
the network processor system is operable to process a plurality of network data flows, and each network data flow is associated with a first FIFO, a second FIFO, and a third FIFO;
the circuit C1 is operable to receive data units on said data flows, to write the data units of each data flow to the first FIFO associated with the data flow, and to write a request to process each data unit of each data flow to the third FIFO associated with the data flow;
the first circuit is operable to read the requests from the third FIFOs and write commands to the second FIFOs, wherein the commands to process each data flow are written to the second FIFO associated with the data flow; and the second circuit is operable to execute the commands in the second FIFOs;

wherein the first circuit is to operate on different data flows on a time division multiplexing basis, and the second circuit is to operate on different data flows on a time division multiplexing basis.

31. The network processor system of claim 30 wherein the data flows comprise:

a data flow from a network port to a segmentation/reassembly device; and a data flow from the device to the network port.

32. The network processor system of claim 30 wherein the data flows comprise a first flow between a first network port and a first segmentation/reassembly device, and a second flow between a second network port and a second segmentation/reassembly device.

33. The network processor system of claim 30 wherein the second circuit executes the commands sequentially one command after another, and executes the commands from different second FIFOs on a time division multiplexing basis.

34. A method for processing a flow of network data flowing to or from a network via a network port of an apparatus which receives and transmits network data, wherein the network data received or transmitted on the network port comprise first address information, the method comprising:

writing the network data to a first FIFO;

obtaining, by a first processor programmed with software prepared before the first processor begins operation, at least a portion of the first address information from the network data, and determining, by the first processor, whether and how the first address information is to be modified in order to deliver the network data to the data's destination;

based on said determining whether and how the first address information is to be modified, the first processor writing, to a second FIFO, commands specifying whether and how the network data is to be modified; and a second processor reading the commands from the second FIFO and executing the commands to modify the network data.

35. The method of claim 34 wherein:

the apparatus comprises a network switch circuitry which switches the network data based on connection identifiers, wherein the network data received or transmitted on the network port do not comprise connection identifiers; and the first processor obtains the connection identifiers using at least a portion of the first address information, and supplies connection identifiers to the second processor for transfer to the switch circuitry.

36. The method of claim 35 wherein the network data received or transmitted on the network port are variable size data units; and the switch circuitry transforms the network data into fixed size cells before switching the modified network data, and the switch circuitry does not use the first address information for switching the fixed size data.

37. The method of claim 34 further comprising maintaining a pointer defining the beginning of the first FIFO, wherein the commands comprise a command to transmit an amount of data from the first FIFO starting with the data defined by said pointer, the amount of data to be transmitted being defined by a parameter of the command.

38. The method of claim 34 further comprising maintaining a pointer defining the beginning of from the first FIFO, wherein the commands comprise a command to transmit an amount of data from the first FIFO starting at an offset relative to said pointer, the offset being defined by a parameter of the command.

39. The method of claim 34 further comprising maintaining a pointer defining the beginning of the first FIFO;

wherein the network data are received or transmitted on the network port in data units each of which comprises the first address information; and wherein the commands comprise a command to transmit an amount of data from a data unit in the first FIFO starting at an offset relative to said pointer until a length of data from the end of the data unit, the offset and the length of data being defined by parameters of the command.

40. The method of claim 34 wherein the commands comprise a command to transmit data other than data in the first FIFO.

41. The method of claim 34 wherein the network data are received or transmitted on the network port in data units each of which comprises the first address information; and wherein determining whether and how the first address information is to be modified comprises the first processor commanding a third processor to search a database by a key provided by the first processor.

* * * * *